(12) United States Patent
Stilwell et al.

(10) Patent No.: US 11,684,998 B2
(45) Date of Patent: Jun. 27, 2023

(54) CONFIGURABLE EXOTHERMIC REACTION MOLD

(71) Applicant: Hubbell Incorporated, Shelton, CT (US)

(72) Inventors: Charles Mitchell Stilwell, Owasso, OK (US); Richard Wallace Ceass, Tulsa, OK (US); Louis Webster Ruffin, Jr., Tulsa, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/020,305

(22) Filed: Jun. 27, 2018

(65) Prior Publication Data

US 2019/0001431 A1    Jan. 3, 2019

Related U.S. Application Data

(60) Provisional application No. 62/525,820, filed on Jun. 28, 2017.

(51) Int. Cl.
| | | |
|---|---|---|
| *B23K 20/16* | (2006.01) | |
| *B23K 37/06* | (2006.01) | |
| *B23K 37/04* | (2006.01) | |
| *B23K 23/00* | (2006.01) | |

(52) U.S. Cl.
CPC ............ *B23K 20/165* (2013.01); *B23K 23/00* (2013.01); *B23K 37/04* (2013.01); *B23K 37/06* (2013.01)

(58) Field of Classification Search
CPC ...... B23K 20/165; B23K 23/00; B23K 37/04; B23K 37/06; Y10T 403/475; Y10T 403/5766; Y10T 403/5781
USPC .................... 249/83, 86; 164/53, 54
See application file for complete search history.

(56) References Cited

U.S. PATENT DOCUMENTS

| | | | | |
|---|---|---|---|---|
| 34,769 A | * | 3/1862 | Northrup | F16D 1/05 403/310 |
| 120,686 A | * | 11/1871 | Weston | F16B 7/0426 403/312 |
| 155,121 A | * | 9/1874 | Stuart | F16B 7/0426 403/312 |
| 1,209,623 A | * | 12/1916 | Rush | F16D 1/04 403/311 |
| 1,380,127 A | * | 5/1921 | Welch | F16B 7/22 403/310 |
| 1,406,229 A | * | 2/1922 | Schneider | F16D 1/04 403/312 |
| 2,067,271 A | * | 1/1937 | Johnson | E21B 17/046 403/310 |

(Continued)

FOREIGN PATENT DOCUMENTS

WO    2004010548    1/2004

OTHER PUBLICATIONS

International Preliminary Report on Patentability mailed in PCT/US2018/039765 dated Jan. 9, 2020.

(Continued)

*Primary Examiner* — Erin B Saad
*Assistant Examiner* — Carlos J Gamino
(74) *Attorney, Agent, or Firm* — Wissing Miller LLP

(57) ABSTRACT

An exothermic reaction mold includes a reaction chamber, a weld chamber communicating with the reaction chamber and at least one user configurable port communicating with the weld chamber for receiving cables to be welded.

18 Claims, 18 Drawing Sheets

(56) References Cited

U.S. PATENT DOCUMENTS

| | | | | |
|---|---|---|---|---|
| 2,089,230 | A * | 8/1937 | Thowless | E21B 17/046 279/55 |
| 2,845,701 | A * | 8/1958 | Daigle | B21F 15/06 29/516 |
| 2,957,214 | A * | 10/1960 | Kuharski | B23K 23/00 164/54 |
| 3,020,608 | A * | 2/1962 | Gelfand | B22D 19/04 164/333 |
| 3,113,359 | A * | 12/1963 | Burke | B23K 23/00 164/333 |
| 3,205,300 | A * | 9/1965 | Becker | H01R 4/52 174/84 S |
| 3,234,603 | A * | 2/1966 | Leuthy | E04C 5/165 164/108 |
| 3,413,030 | A * | 11/1968 | Drake | B63G 8/00 294/82.24 |
| 3,605,236 | A * | 9/1971 | Bouckaert | H01R 43/04 29/747 |
| 3,638,978 | A * | 2/1972 | Guntermann | E04C 5/165 403/267 |
| 3,681,512 | A * | 8/1972 | Werner | H01R 4/08 174/84 R |
| 3,791,751 | A * | 2/1974 | Vey | B23P 6/00 403/311 |
| 3,901,610 | A * | 8/1975 | Mason | F16G 11/02 403/78 |
| 4,024,688 | A * | 5/1977 | Calini | E04C 5/165 52/378 |
| 4,082,409 | A * | 4/1978 | Bailey | H01R 31/00 439/638 |
| 4,453,034 | A * | 6/1984 | Annas | H01R 4/20 174/79 |
| 4,575,916 | A * | 3/1986 | Naitoh | B60R 22/22 24/579.11 |
| 4,752,151 | A * | 6/1988 | Ashida | F16B 3/00 403/266 |
| 5,027,497 | A * | 7/1991 | Takaki | B22D 19/14 29/527.5 |
| 5,062,903 | A | 11/1991 | Bronan et al. | |
| 5,171,378 | A | 12/1992 | Kovarik | |
| 5,332,329 | A * | 7/1994 | Hill | H02G 3/0658 403/261 |
| 5,425,602 | A * | 6/1995 | Seegmiller | E21D 11/006 403/302 |
| 5,490,888 | A | 2/1996 | Assel | |
| 5,533,662 | A * | 7/1996 | Stidham | B23K 23/00 228/33 |
| 5,538,174 | A | 7/1996 | Gaman | |
| 5,660,317 | A * | 8/1997 | Singer | B23K 23/00 228/44.3 |
| 5,732,525 | A * | 3/1998 | Mochizuki | E04C 5/165 52/848 |
| 5,829,510 | A | 11/1998 | Fuchs | |
| 5,967,691 | A * | 10/1999 | Lancelot, III | E04C 5/165 403/296 |
| 6,135,670 | A * | 10/2000 | Bahnman | E21B 19/12 166/77.51 |
| 6,316,125 | B1 | 11/2001 | Gaman et al. | |
| 6,382,496 | B1 * | 5/2002 | Harger | B23K 23/00 228/234.3 |
| 6,553,911 | B1 | 4/2003 | Walker et al. | |
| 6,703,578 | B2 | 3/2004 | Walker et al. | |
| 6,776,386 | B1 * | 8/2004 | Morrissey | B23K 23/00 164/54 |
| 6,789,724 | B2 * | 9/2004 | Cordier | B23K 23/00 228/234.3 |
| 6,824,471 | B2 * | 11/2004 | Kamenov | F04D 13/021 464/182 |
| 6,835,910 | B2 | 12/2004 | Moore et al. | |
| 6,994,244 | B2 | 2/2006 | Harger et al. | |
| 7,552,913 | B1 * | 6/2009 | Amoss | F16G 11/12 254/233 |
| 7,950,568 | B2 | 5/2011 | Stidham et al. | |
| 8,360,391 | B2 * | 1/2013 | Morris | F16K 31/54 251/93 |
| 8,371,768 | B1 * | 2/2013 | Wu | F16B 7/042 403/294 |
| 8,581,149 | B2 | 11/2013 | Stidham et al. | |
| 9,099,848 | B2 * | 8/2015 | MacAllister | F16G 11/106 |
| 2002/0104953 | A1 | 8/2002 | Triantopoulos et al. | |
| 2003/0178168 | A1 | 9/2003 | Triantopoulos et al. | |
| 2007/0119562 | A1 * | 5/2007 | Gregory | F16G 11/042 164/54 |
| 2009/0173873 | A1 | 7/2009 | Stidham et al. | |
| 2011/0132967 | A1 * | 6/2011 | Lofton | B22D 19/04 228/33 |
| 2011/0198391 | A1 | 8/2011 | Stidham et al. | |
| 2011/0240244 | A1 | 10/2011 | Sepelak et al. | |
| 2012/0255699 | A1 | 10/2012 | Sepelak et al. | |
| 2013/0105560 | A1 * | 5/2013 | Duart Lvarez De Cienfuegos | B23K 23/00 228/198 |
| 2013/0199747 | A1 | 8/2013 | Stidham et al. | |

OTHER PUBLICATIONS

International Search Report and Written Opinion mailed in PCT/US18/39765 dated Sep. 20, 2018.

Cadweld Multi, Pentair by Erico International Corporation. 2015 (2 pages).

Cadweld Plus Brochure, Erico, 2012; (4 pages).

Cadweld Welded Electrical Connections, Eritech International Corporation, 2009 (54 pages).

* cited by examiner

CONFIGURABLE EXOTHERMIC REACTION MOLD

CROSS REFERENCE TO RELATED APPLICATIONS

The present application is based on and claims benefit from U.S. Provisional Patent Application Ser. No. 62/525,820, filed Jun. 28, 2017 and entitled "Configurable Exothermic Reaction Mold" the contents of which are incorporated herein in their entirety by reference.

BACKGROUND

Field

The present disclosure relates to exothermic reaction molds and, more particularly, to configurable exothermic reaction molds.

Description of the Related Art

Exothermic reaction welding is often used for providing a permanent joint between metal parts including ground rods, wire cables, piping, etc. Exothermic reaction molds are used to weld materials together. For example, exothermic reaction molds may be used to provide permanent joints between ground rods, wire cables, pipes, etc. An exothermic reaction mold is reusable and includes an internal crucible (e.g., reaction chamber) and a mold portion below the crucible for holding the part or parts (e.g., cables) to be joined. An orifice extends from the internal crucible to the mold portion. A disc of material (generally steel) is placed in a bottom portion of the crucible and an exothermic powder (e.g., an exothermic weld powder) is then poured into the crucible on top of the disc of material. The mold generally includes a removable cover which may be hinged to a portion of the mold. If a flint gun is to be used to initiate the exothermic reaction, the cover would generally have a hole extending from the top of the cover into the crucible and starting powder would be poured on the cover so that is covers the hole, which allows ignited starting powder to ignite the exothermic powder in the crucible. If an electrical ignition system is to be used to initiate the exothermic reaction, an ignitor is inserted into the exothermic powder in the crucible and the ignition system is activated. When the exothermic powder ignites either via ignition of a starting powder or an electric ignitor, an exothermic reaction is created in the crucible. The exothermic reaction liquefies the exothermic powder and the disc of material 40 which then flow down from the crucible into the mold portion holding the parts to be joined. When the mold has cooled sufficiently, the mold is removed, leaving the parts (e.g., cables) welded together with a solid molecular bond.

Exothermic reaction molds may be provided in various configurations for joining two, three, four, etc. sections of cable and/or for joining cable to pipe, steel beam, rail (e.g., a railroad rail), rebar, ground rods, etc. In addition, multiple molds may be provided in each configuration, each for joining cables of a specific diameter. Customers thus use and maintain multiple exothermic molds having various configurations.

Accordingly, a need exists for an exothermic reaction mold that can be configured by the user. In particular, a need exists for an exothermic reaction mold that can be reconfigured by the user to join various numbers of cables. In addition, a need exists for an exothermic reaction mold that can be reconfigured by the user to join cables having various diameters.

SUMMARY

An exothermic reaction mold includes a reaction chamber, a weld chamber communicating with the reaction chamber and at least one user configurable port communicating with the weld chamber for receiving cables to be welded.

An exothermic reaction mold includes a first section including an exothermic reaction chamber and a first portion of a weld chamber communicating with the exothermic reaction chamber, a second section comprising a second portion of the weld chamber. The first and second portions of the weld chamber comprise portions of user configurable ports for receiving cables to be welded.

An exothermic reaction mold half includes a portion of an exothermic reaction chamber, a portion of a weld chamber communicating with the exothermic reaction chamber and portions of user configurable ports communicating with the weld chamber for receiving cables to be welded.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Illustrative embodiments of the present disclosure may be provided as improvements to exothermic reaction molds. For example, an exothermic reaction mold according to an illustrative embodiment of the present disclosure is configurable by the user.

Illustrative embodiments of the present disclosure provide an exothermic reaction mold that allows users to configure the mold for joining a desired number of cables.

Illustrative embodiments of the present disclosure provide an exothermic reaction mold that allows users to configure the mold for joining cables having various diameters.

Illustrative embodiments of the present disclosure provide an exothermic reaction mold including ports for receiving cables to be joined, the ports capable of being resized by the user for receiving cables of various diameters.

Illustrative embodiments of the present disclosure provide an exothermic reaction mold including ports for receiving cables to be joined. One or more of the ports may be selectively blocked by the user allowing the mold to be utilized for joining various numbers of cables.

Figure 1A:
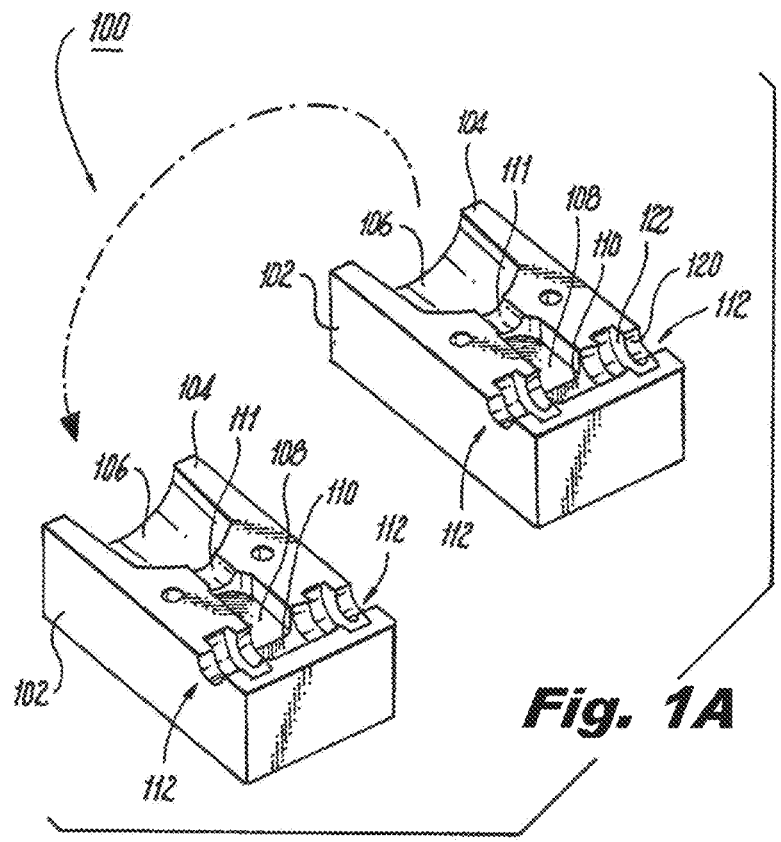
FIGS. 1A-1C and 1E depict an exothermic reaction mold according to an illustrative embodiment of the present disclosure.
Figure 1B:
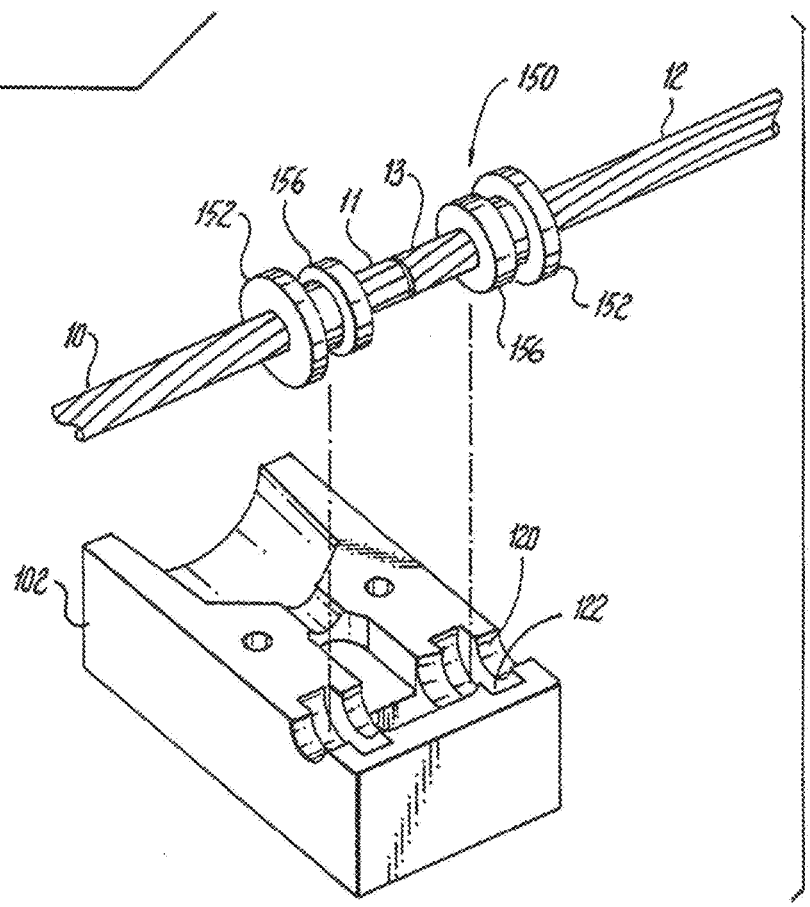
Figure 1C:
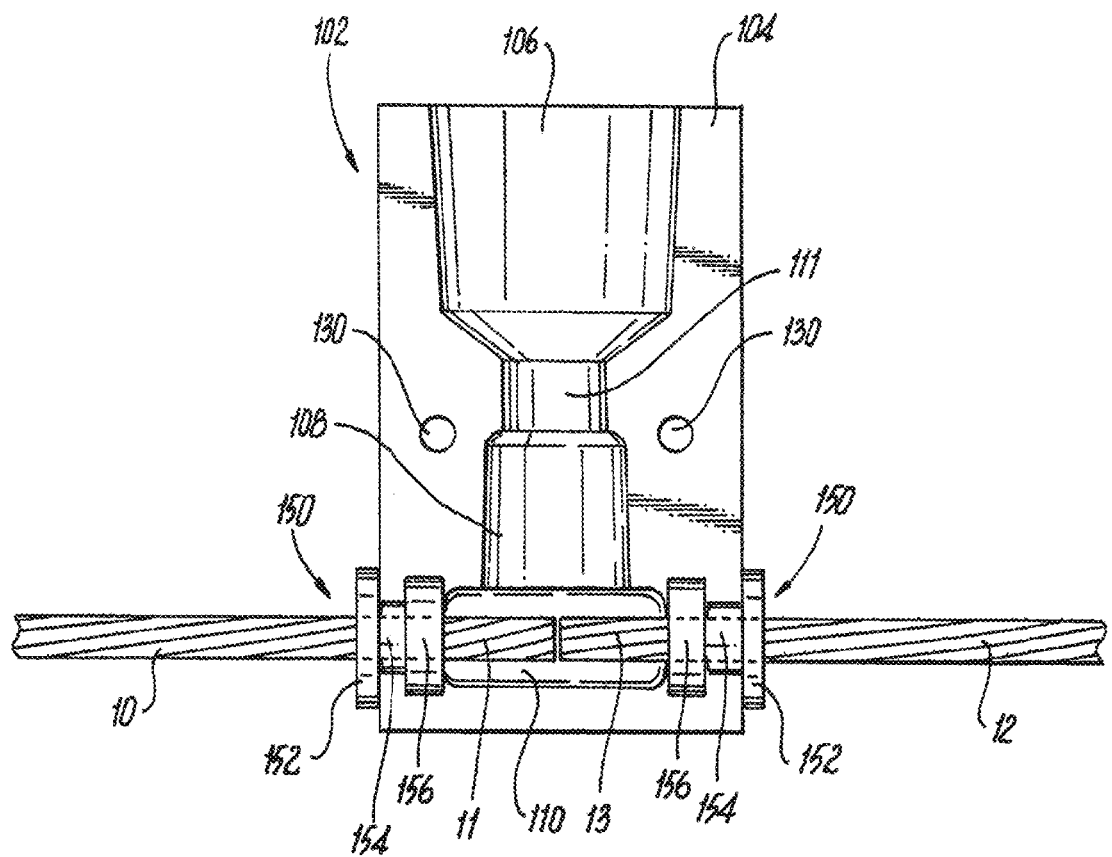
Figure 1D:
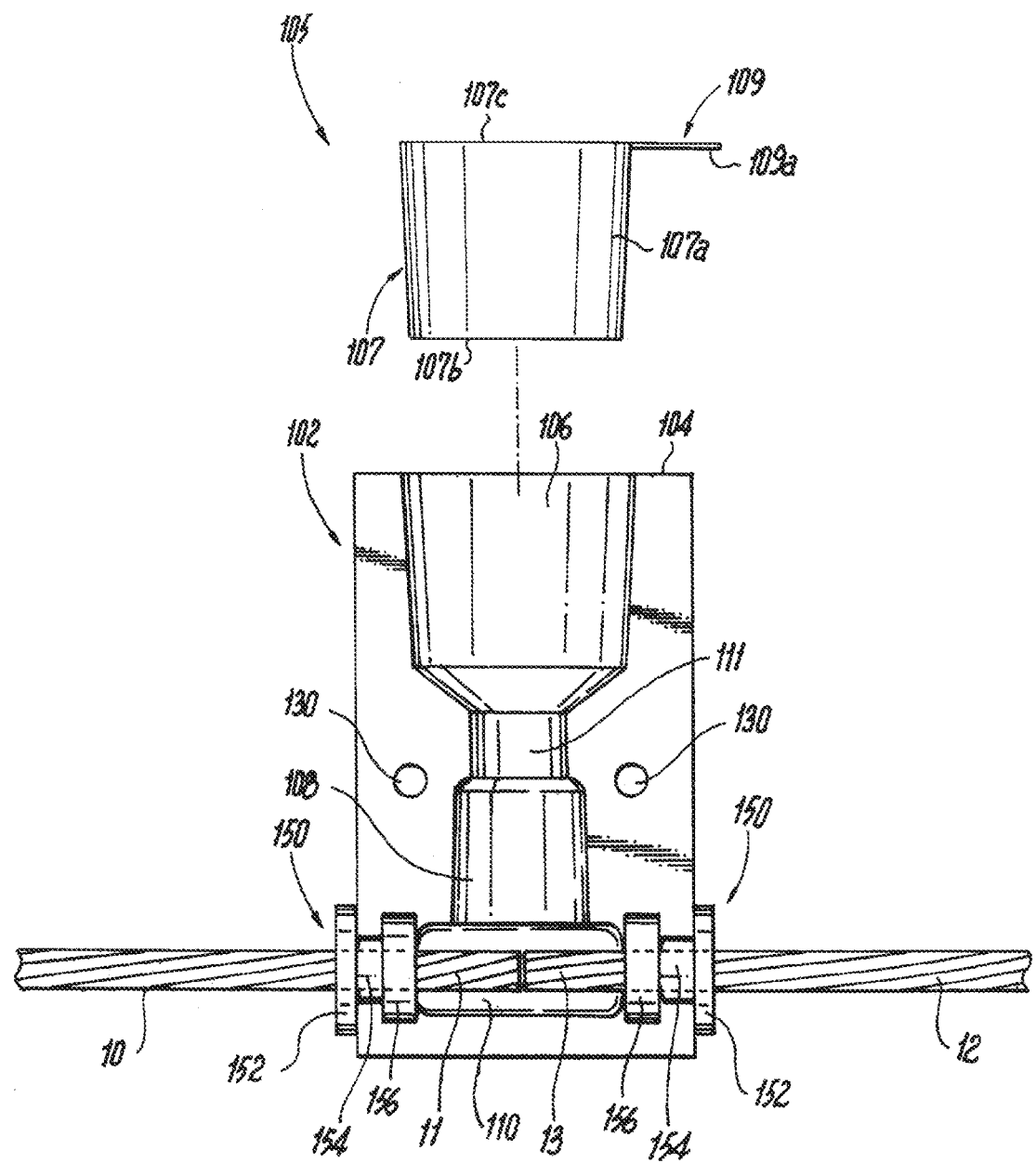
FIG. 1D depicts an exothermic reaction mold according to an illustrative embodiment of the present disclosure.
Figure 1E:
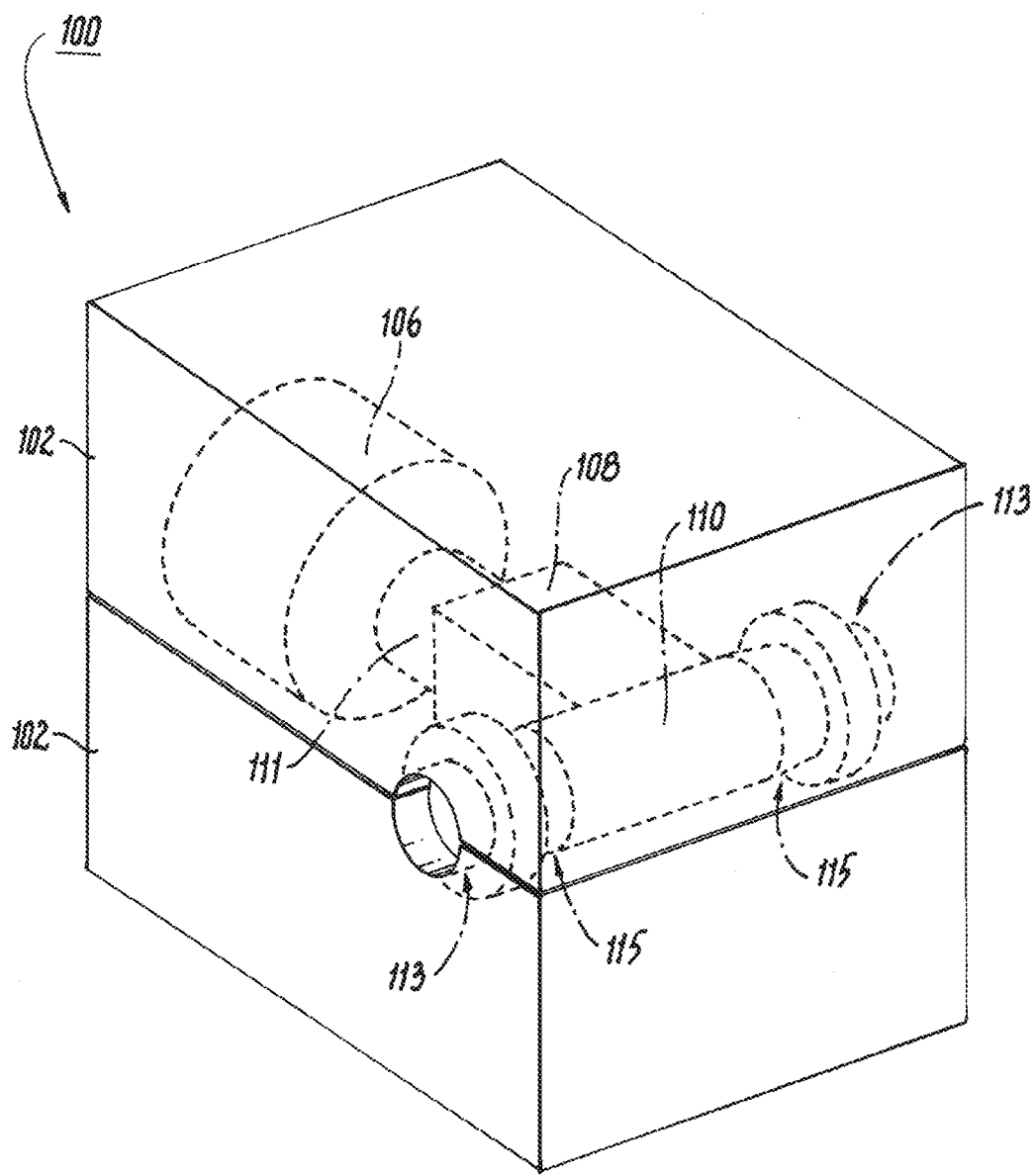

An exothermic reaction mold according to an illustrative embodiment of the present disclosure is shown in FIGS. 1A-1C and is referred to generally as mold 100. Mold 100 includes two vertical mold halves 102. Each mold half 102 includes abutting face portion 104, reaction chamber portion 106 and weld chamber portion 108. An orifice portion 111 extends between reaction chamber portion 106 and weld chamber portion 108. Weld chamber portion 108 includes a cable abutting section 110 where cables being welded together abut one another. Weld chamber portions 108 also include bushing receiving portions 112. It is noted that when the mold halves 102 are mated, the mated bushing receiving portions 112 form a bushing holding portion 113, shown schematically in FIG. 1E. It is also noted that when the mold halves 102 are mated, the mated cable abutting sections 110 and bushing receiving portions 112 form user configurable ports 115, shown schematically in FIG. 1E. As shown in FIGS. 1B and 1C, the terminal ends 11, 13 of cables 10 and 12 are to be welded together. Bushings 150 have an orifice extending there through having a diameter dimensioned to receive cables 10 and 12. As will be described in more detail later below, a number of bushings 150 may be provided each having an orifice extending there through with a diameter suitable for receiving a cable 10 and/or 12 of a particular diameter. This allows the end user to select the appropriate bushing for the particular sized cables 10 and/or 12 being welded. Bushings 150 are slid onto the cables 10 and 12 as shown. Bushing 150 includes a first end section 156 having an outer diameter and thickness dimensioned to be received in slot 122 of bushing receiving portion 112 in mold 100. Middle section 154 of bushing 150 has an outer diameter and width dimensioned to be received in notch portion 120 of bushing holding portion 112 in mold 100. According to an illustrative embodiment of the present disclosure, a second end section 152 of bushing 150 is at least slightly larger in diameter than notch portion 120. As will be described later below, bushings 150 may be provided in various shapes and configuration.

After the cables 10 and 12 and bushings 150 are positioned in mold half 102 as shown in FIG. 1C, the other mold half 102 is clamped in position. For example, holes 130 may be provided in the mold halves 102 for receiving a clamp (not shown) for clamping the mold halves 102 together. Examples of clamps include the thermOweld® B-106, B-107 handle clamps manufactured by Continental Industries. A steel disc and welding material (e.g., an exothermic powder) are inserted into the reaction chamber 106. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible and the ignition system is activated to ignite the exothermic powder within the crucible causing the exothermic reaction to occur. Once the exothermic reaction initiates, the steel disc begins to melt and the molten steel flows down through orifice portion 111 into weld chamber 108 and welds the cables 10 and 12 together. It will be appreciated that mold halves 102 may be joined by a hinge. In another illustrative embodiment shown in FIG. 1D, a replaceable container such as crucible assembly 105 can be used to create the exothermic reaction within the reaction chamber portion 106 of the mold 100. The crucible assembly 105 may be consumable or non-consumable as is known in the art. In this illustrative embodiment, the crucible assembly 105 includes a container 107 and an ignitor 109. The container 107 has side walls 107a, a fusible bottom 107b and a cover 107c. The cover 107c of the container 107 engages a top edge of the container 107, sealing the welding material and the first end of the ignitor 109 within the container 107. Within the container 107 is the welding material (e.g., an exothermic powder). The ignitor 109 has a first end (not shown) that is above or partially within the welding material within the container 107 and a second end 109a that is protruding from the container 107 for connection to an electrical ignition system. An exemplary crucible assembly is shown and described in U.S. Pat. No. 6,835,910 which is incorporated herein in its entirety by reference.

Figure 2A:
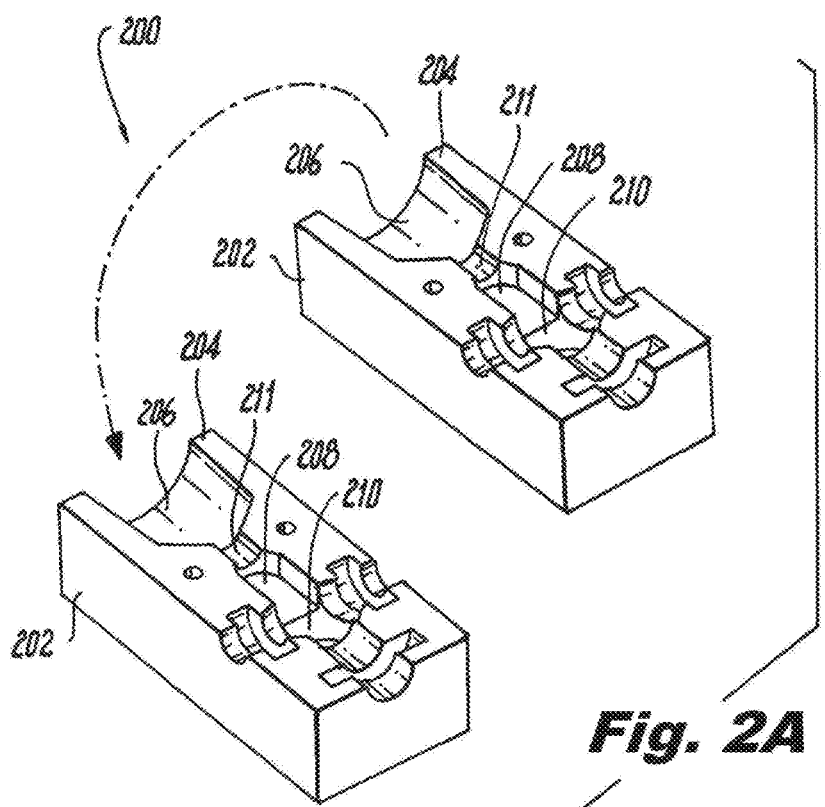
FIGS. 2A, 2B and 2D depict an exothermic reaction mold according to an illustrative embodiment of the present disclosure.
Figure 2B:
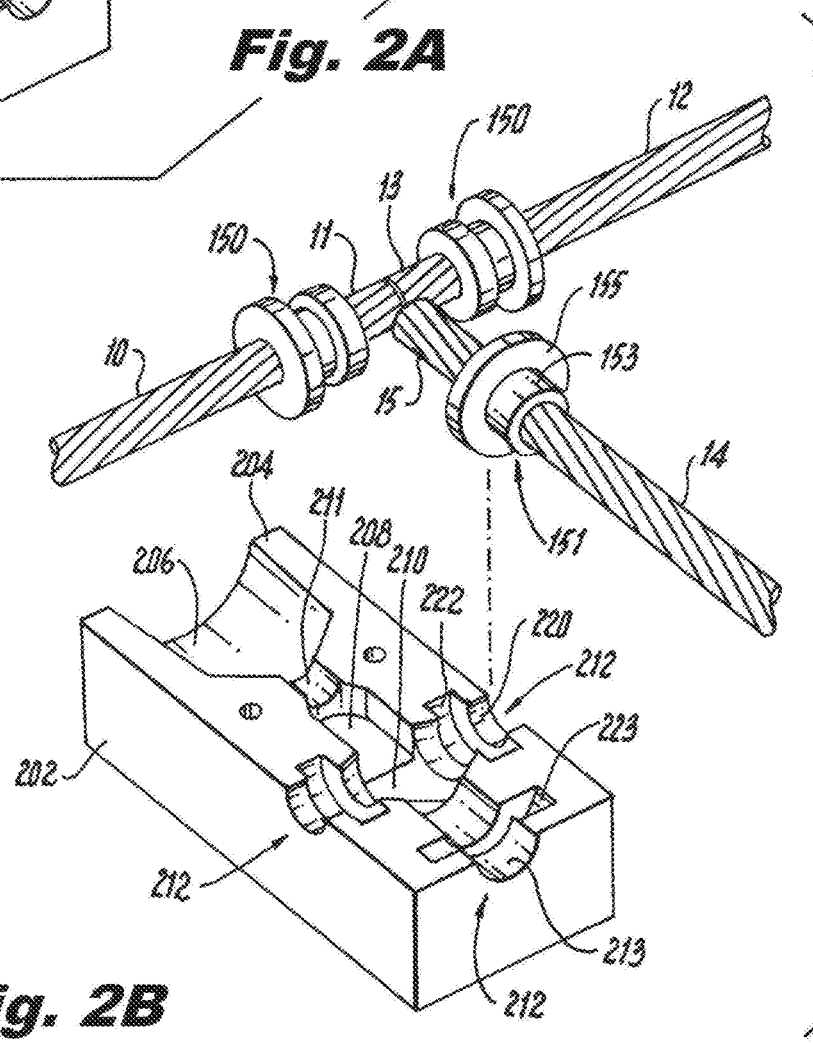
Figure 11:
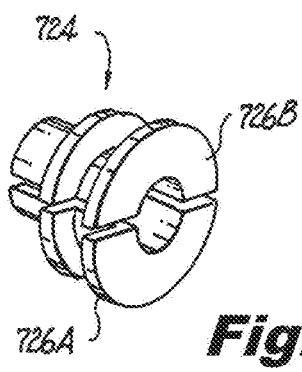

An exothermic reaction mold according to another illustrative embodiment of the present disclosure is shown in FIGS. 2A and 2B and is referred to generally as mold 200. Mold 200 includes two vertical mold halves 202. Each mold half 202 includes abutting face portion 204, reaction chamber portion 206 and weld chamber portion 208. An orifice portion 211 extends between reaction chamber portion 206 and weld chamber portion 208. According to the present illustrative embodiment of the present disclosure, mold 200 is capable of welding up to three sections of cable. Weld chamber portion 208 includes a cable abutting section 210 where cables being welded together abut one another. Weld chamber portions 208 include three bushing receiving portions 212. It is noted that when the mold halves 202 are mated, the mated bushing receiving portions 212 form a bushing holding portion 213, shown schematically in FIG. 2D. It is also noted that when the mold halves 202 are mated, the mated cable abutting sections 210 and bushing receiving portions 212 form user configurable ports 215, shown schematically in FIG. 2D. As shown in FIG. 2B, the terminal ends 11, 13 and 15 of cables 10 and 12 and 14 are to be welded together. Bushings 150 have an orifice extending there through having a diameter dimensioned to receive cables 10 and 12. Bushings 150 are slid onto cables 10 and 12 and positioned within mold half 202. Bushings 150 are similar to those described above with respect to FIGS. 1A-1C. According to an illustrative embodiment of the present disclosure as shown in FIG. 2B, the bushings for holding the cables may be provided in various shapes and configurations. For example, as shown in FIG. 2B, a bushing 151 includes a first portion 153 having an outer diameter dimensioned to be received in notch 213 and a second portion 155 having an outer diameter dimensioned to be received in slot 223. Bushing 151 does not include a portion 152 as described above with respect to bushing 150. As with the other bushings described herein, the diameter of the orifice extending through bushing 151 is appropriately dimensioned to receive a cable 14 to be welded. Cables 10 and 12 may actually be a single section of cable to which cable 14 is to be welded. In this event, split bushings 724 such as shown in FIG. 11 may be provided on the single section of cable. Cable 14 is then positioned abutting the cable in cable abutting section 210.

After the cables 10, 12 and 14 and bushings 150 and 151 are positioned in mold half 202, the other mold half 202 is clamped in position. Examples of clamps include the thermOweld® B-106, B-107 handle clamps manufactured by Continental Industries. A steel disc and welding material, e.g., an exothermic powder, are inserted into the reaction chamber 206. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly is inserted into the crucible and the ignitions system is activated to ignite the exothermic powder within the crucible causing the exothermic reaction to occur. Once the exothermic reaction initiates, the steel disc begins to melt and the molten steel flows down through orifice portion 211 into weld chamber 208 and welds the cables 10, 12 and 14 together. It will be appreciated that mold halves 202 may be joined by a hinge.

Figure 2C:
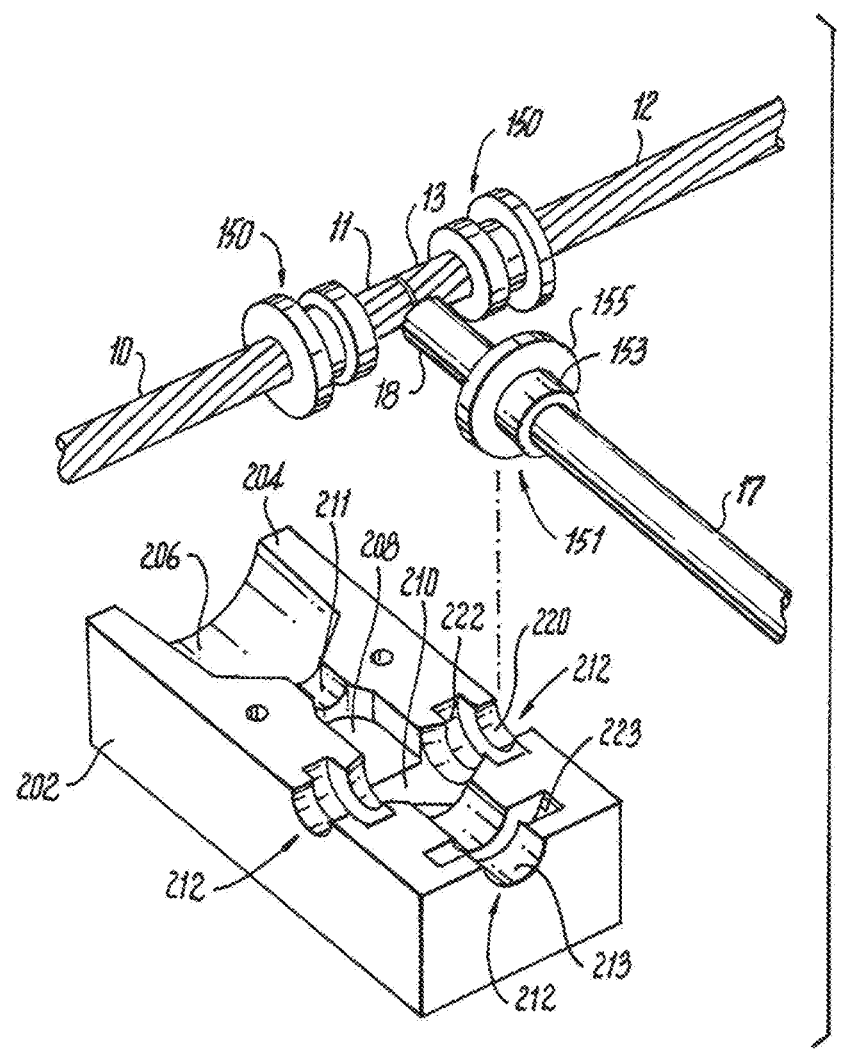
FIG. 2C depicts an exothermic reaction mold according to an illustrative embodiment of the present disclosure.
Figure 2D:
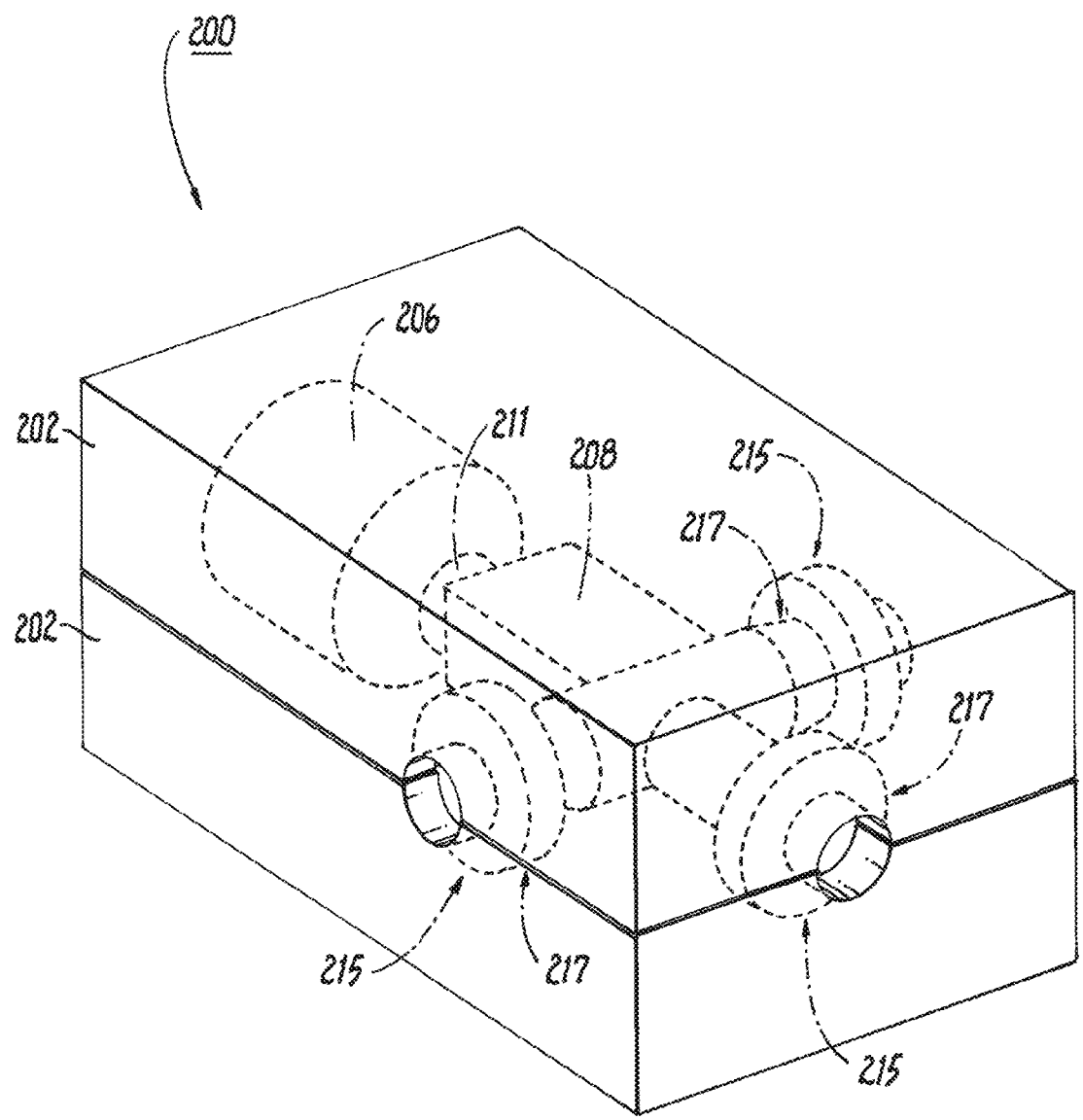

An exothermic reaction mold according to another illustrative embodiment of the present disclosure is shown in FIG. 2C and is also referred to generally as mold. The mold shown in FIG. 2C is similar to the mold 200 described above such that like components have the same reference numerals. The difference in FIG. 2C is that a ground rod 17 having a terminal end 18 is substituted for cable 14. The bushing 151 includes a first portion 153 having an outer diameter dimensioned to be received in notch 213 and a second portion 155 having an outer diameter dimensioned to be received in slot 223. As with the other bushings described herein, the diameter of the orifice extending through bushing 151 in this illustrative embodiment is appropriately dimensioned to receive a ground rod 17 to be welded. Non-limiting examples of the size of the ground rod that can inserted into the orifice extending through bushing 151 include ½-inch, ⅝ inch and ¾-inch ground rods.

After the terminal ends 11 and 13 of cables 10 and 12, respectively, the terminal end 18 of ground rod 17, and the bushings 150 and 155 are positioned in mold half 202, the other mold half 202 is clamped in position. Examples of clamps include the thermOweld® B-106, B-107 handle clamps manufactured by Continental Industries. A steel disc and welding material, e.g., an exothermic powder, are inserted into the reaction chamber 206. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly is inserted into the crucible and the ignitions system is activated to ignite the exothermic powder within the crucible causing the exothermic reaction to occur. Once the exothermic reaction initiates, the steel disc begins to melt and the molten steel flows down through orifice portion 211 into weld chamber 208 and welds the cables 10 and 12 to the ground rod 17. It will be appreciated that mold halves 202 may be joined by a hinge.

Figure 3A:
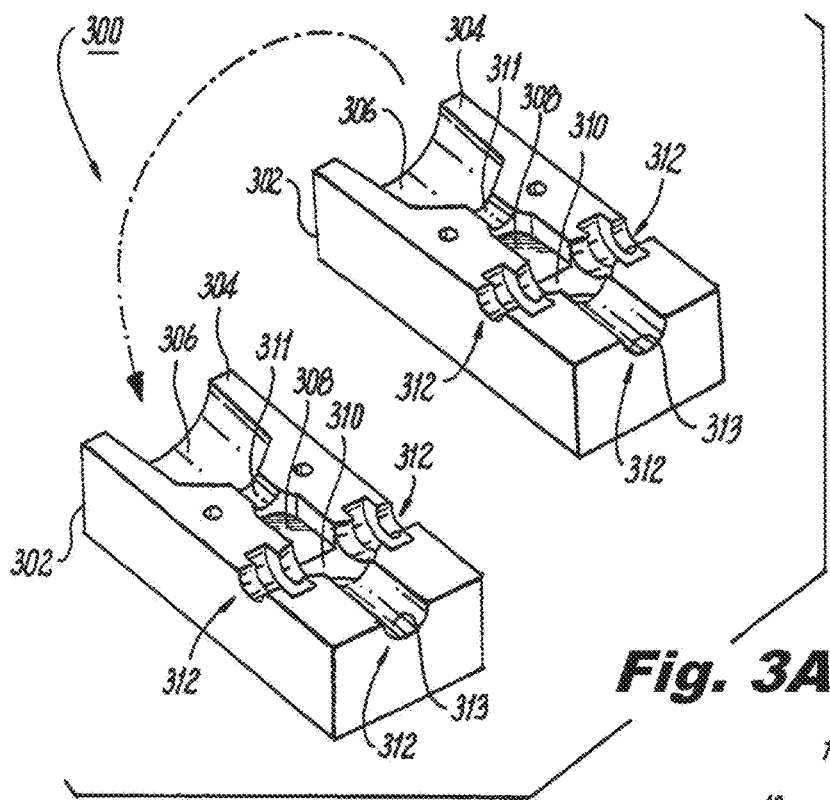
FIGS. 3A, 3B and 3C depict an exothermic reaction mold according to an illustrative embodiment of the present disclosure.
Figure 3B:
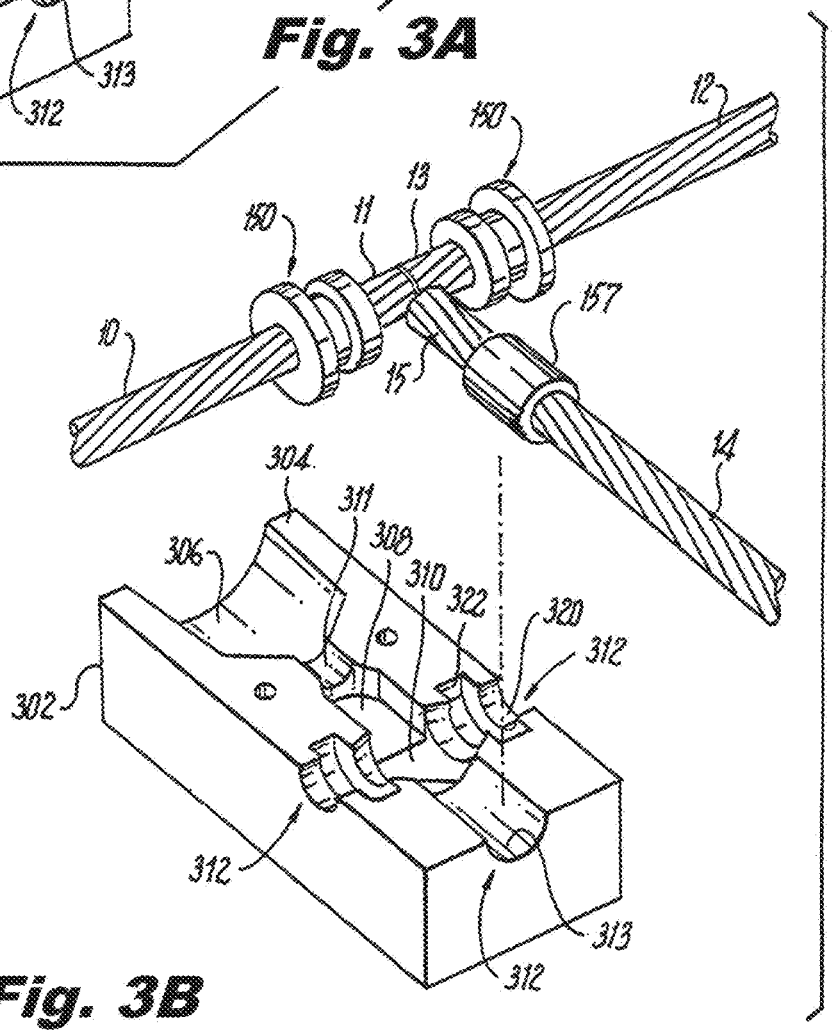
Figure 3C:
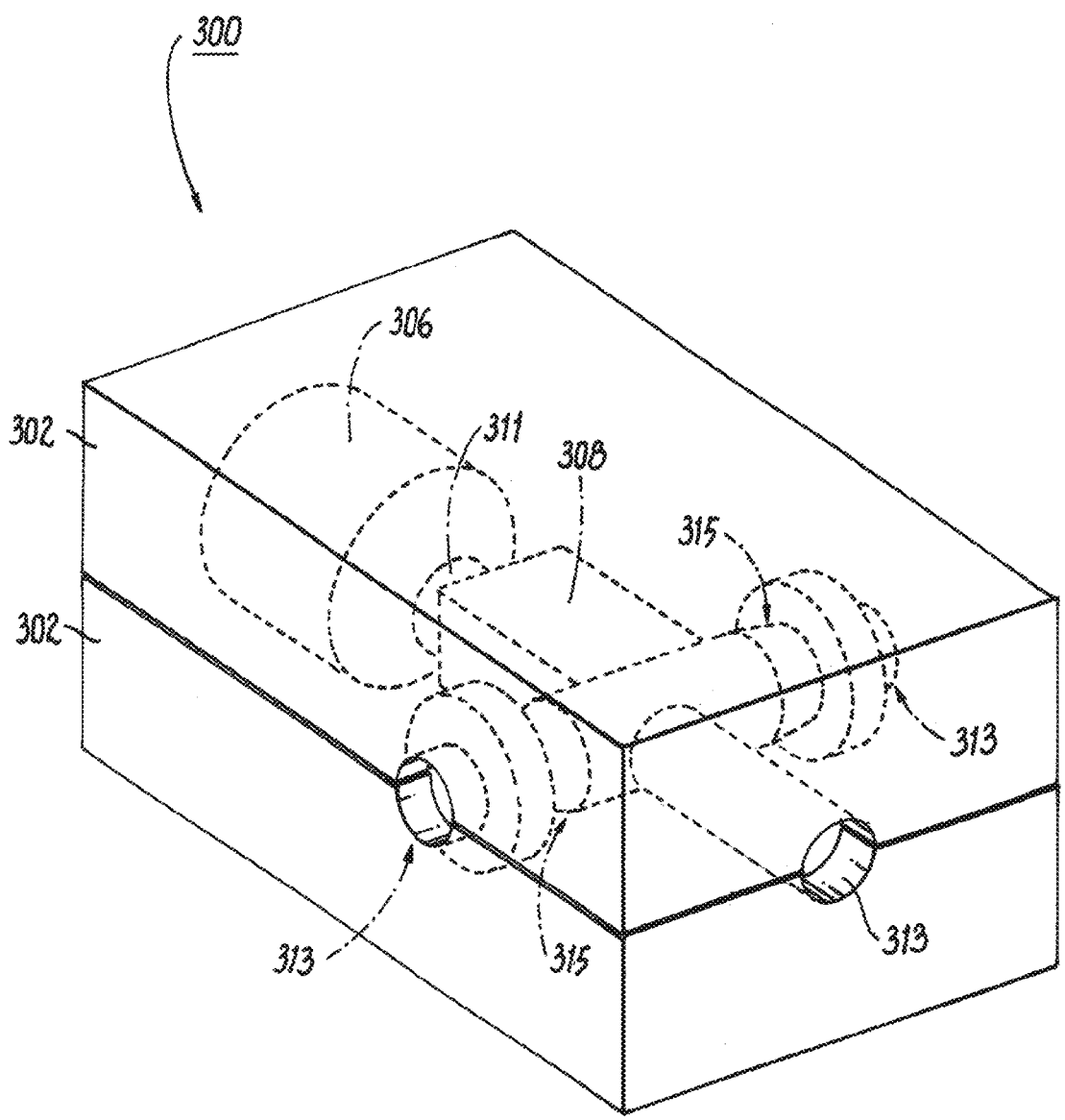

An exothermic reaction mold according to another illustrative embodiment of the present disclosure is shown in FIGS. 3A and 3B and is referred to generally as mold 300. Mold 300 includes two vertical mold halves 302. Each mold half 302 includes abutting face portion 304, reaction chamber portion 306 and weld chamber portion 308. An orifice portion 311 extends between reaction chamber portion 306 and weld chamber portion 308. According to the present illustrative embodiment of the present disclosure, mold 300 is capable of welding up to three sections of cable. Weld chamber portions 308 include cable abutting sections 310 where cables being welded together abut one another. Weld chamber portions 308 also include bushing holding receiving portions 312. It is noted that when the mold halves 302 are mated, the mated bushing receiving portions 312 form a bushing holding portion 313, shown schematically in FIG. 3C. It is also noted that when the mold halves 302 are mated, the mated cable abutting sections 310 and bushing receiving portions 312 form user configurable ports 315, shown schematically in FIG. 3C. As shown in FIG. 3B, the terminal ends 11, 13 and 15 of cables 10 and 12 and 14 are to be welded together. Bushings 150 have an orifice extending there through having a diameter dimensioned to receive cables 10 and 12. Bushings 150 are slid onto cables 10 and 12 and positioned within mold half 302. Bushing 150 is dimensioned to be received in slot 322 and notch 320. According to an illustrative embodiment of the present disclosure as shown in FIG. 3B, the bushings for holding the cables may be provided in various shapes and configurations. For example, as shown in FIG. 3B, bushing 157 is a substantially tubular member having an outer diameter dimensioned to be received in notch 313 of mold 300. As with the other bushings described herein, the diameter of the orifice extending through bushing 157 is appropriately dimensioned to receive a cable 14 to be welded. Cables 10 and 12 may actually be a single section of cable to which cable 14 is to be welded. In this event, split bushings 724 such as shown in FIG. 11 may be provided on the single section of cable. Cable 14 is then positioned abutting the cable in cable abutting section 310. In addition, one skilled in the art would readily appreciate that the cable 14 in FIG. 3B can be substituted with a ground rod similar to that shown in FIG. 2C.

After the cables 10, 12, 14 and bushings 150, 157 are positioned in mold half 302, the other mold half 302 is clamped in position. Examples of clamps include the thermOweld® B-106, B-107 handle clamps manufactured by Continental Industries. A steel disc and welding material, e.g., an exothermic powder, are inserted into the reaction chamber 306. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly 105 is inserted into the crucible and the ignitions system is activated to ignite the exothermic powder within the crucible causing the exothermic reaction to occur. Once the exothermic reaction initiates, the steel disc begins to melt and the molten steel flows down through orifice portion 311 into weld chamber 308 and welds the cables 10, 12 and 14 together. It will be appreciated that mold halves 302 may be joined by a hinge.

Figure 4:
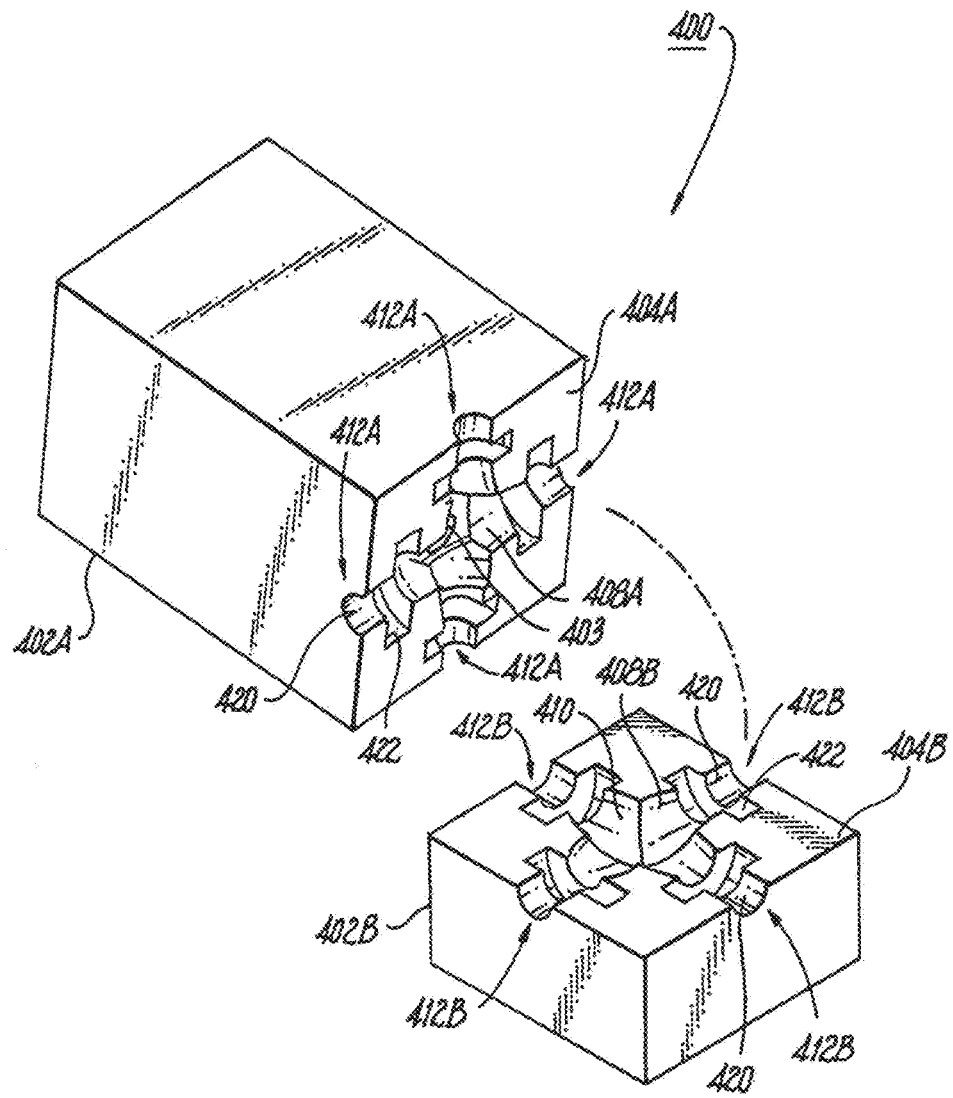
FIGS. 4 and 4A depict an exothermic reaction mold according to an illustrative embodiment of the present disclosure.
Figure 4A:
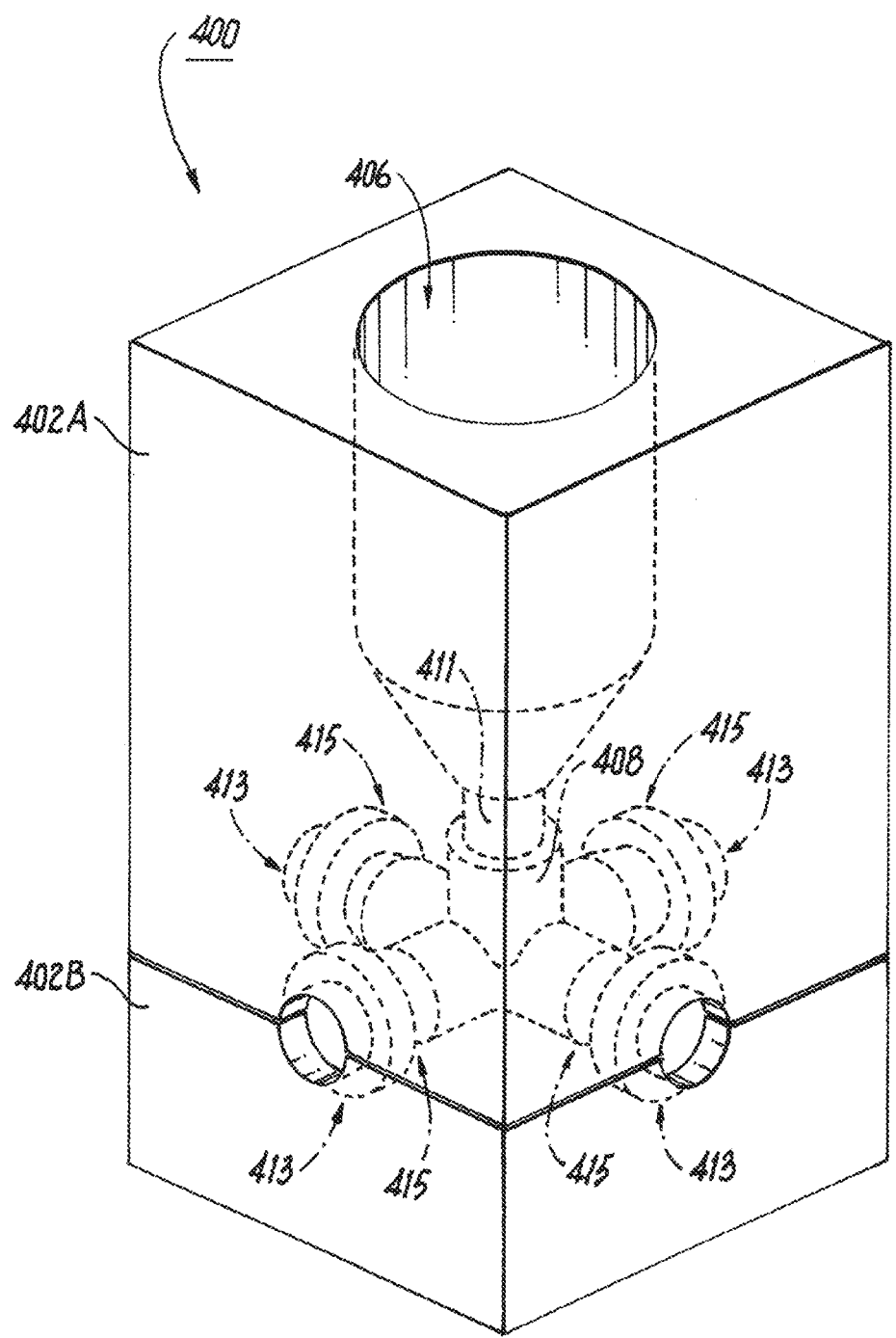

An exothermic reaction mold according to another illustrative embodiment of the present disclosure is shown in FIG. 4 and is referred to generally as mold 400. Mold 400 includes an upper horizontal mold half 402A and a lower horizontal mold half 402B. Mold halves 402A and 402B include abutting face portions 404A and 404B, respectively. Mold halves 402A and 402B also include mold chamber portion 408A and 408B, respectively. Although not shown, upper horizontal mold half 402A includes a reaction chamber, which is similar to the reaction chambers described herein, that communicates via orifice 403 with mold chamber portion 408A and 408B. According to an illustrative embodiment of the present disclosure, mold 400 is capable of welding up to four sections of cable. Weld chamber portions 408A and 408B include a cable abutting section 410 where cables being welded together abut one another. Weld chamber portions 408A and 408B also include bushing receiving portions 412A and 412B. The terminal ends of cables to be welded together are each passed through a bushing such as bushing 150 described above and are positioned in bushing receiving portions 412B of mold half 402B. Bushing 150 has an outer diameter and width dimensioned to be received in notch 420 and slot 422 of bushing receiving portion 412B in mold 400. The other mold half 402A is then clamped in position. It is noted that when the mold halves 302 are mated, e.g., clamped, the mated bushing receiving portions 412A and 412B each form a bushing holding portion 413, shown schematically in FIG. 4A. It is also noted that when the mold halves 402A and 402B are mated, the mated cable abutting sections 410 and bushing receiving portions 412A and 412B form user configurable ports 415, shown schematically in FIG. 4A. A steel disc and welding material, e.g., an exothermic powder, are inserted into the reaction chamber (not shown), which may be similar to the reaction chamber described herein. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly is inserted into the crucible and the ignitions system is activated to ignite the exothermic powder within the crucible causing the exothermic reaction to occur. Once the exothermic reaction initiates, the steel disc begins to melt and the molten steel flows down through orifice 411 into weld chamber 408 and welds the cables together. It will be appreciated that mold halves 402A and 402B may be joined by a hinge. As with the embodiments described above with respect to FIGS. 2 and 3, a single section of cable may extend through mold 400 and one or two terminal ends of cables may be welded thereto. In this case, split bushings 724 such as shown in FIG. 11 may be provided on the single section of cable. If two cables are to be welded to the single section of cable, each is held in position in mold 400 utilizing a bushing 150 such as those described above. If only one cable is being welded to the single section of cable, a solid blank plug 720 such as that shown in FIG. 9 may be positioned in one of the bushing receiving portions 412A and 412B. In addition, one skilled in the art would readily appreciate that one or more ground rods can be substituted for one or more of the cables being welded.

After the cables and bushings are positioned in mold half 402B, the other mold half 402A is then positioned so that face portions 404A and 404B of the mold halves abut. The mold halves may then be clamped together using a suitable clamp. Examples of clamps include the thermOweld® B-106, B-107 handle clamps manufactured by Continental Industries. A steel disc and welding material, e.g., an exothermic powder, are inserted into the reaction chamber (not shown) of mold 400. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly 105 is inserted into the crucible and the ignitions system is activated to ignite the exothermic powder within the crucible causing the exothermic reaction to occur. Once the exothermic reaction initiates, the steel disc begins to melt and the molten steel flows down through an orifice portion into weld chamber 408 and welds the cables together. It will be appreciated that mold halves 402 may be joined by a hinge.

Figure 5:
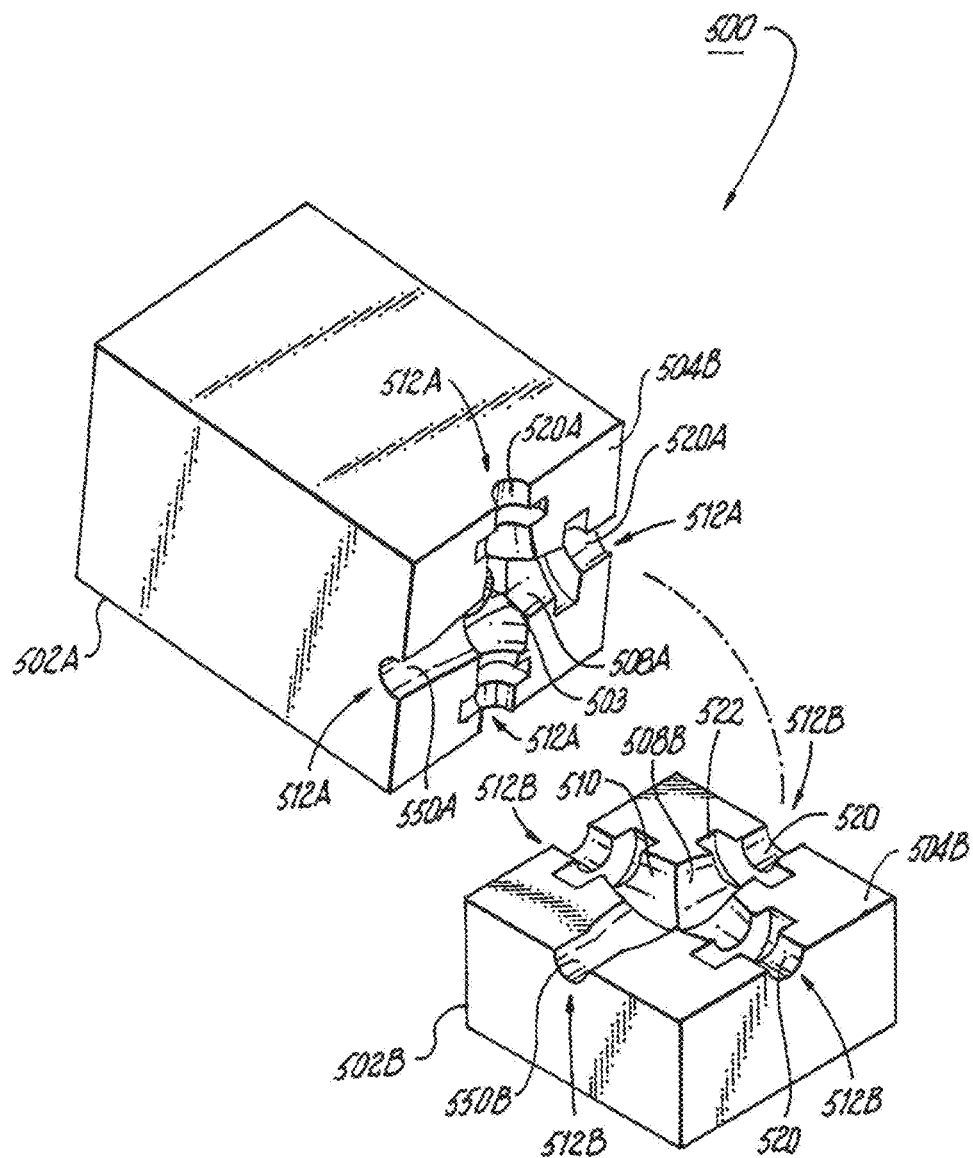
FIG. 5 depicts an exothermic reaction mold according to an illustrative embodiment of the present disclosure.

An exothermic reaction mold according to another illustrative embodiment of the present disclosure is shown in FIG. 5 and is referred to generally as mold 500. Mold 500 includes an upper horizontal mold half 502A and a lower horizontal mold half 502B. Mold halves 502A and 502B include abutting face portions 504A and 504B, respectively. Mold halves 502A and 502B also include weld chamber portions 508A and 508B, respectively and slot 522 and notch 520. Although not shown, upper horizontal mold half 502A includes a reaction chamber that communicates via orifice 503 with weld chamber portion 508A and 508B. According to the present illustrative embodiment of the present disclosure, mold 500 is capable of welding up to four sections of cable. Weld chamber portion 508 includes a cable abutting section 510 where cable ends being welded together abut one another. Weld chamber portions 508A and 508B include bushing holding portions 512A and 512B. The terminal ends of cables to be welded together are each passed through a bushing such as bushing 150 described above and are positioned in holding portions 512A of mold half 502A. According to illustrative embodiments of the present disclosure, the exothermic reaction mold may be capable of receiving more than one type of bushing for holding a cable in position. For example, as shown in FIG. 5, each half of mold 500 includes a semi-circular tapered groove 550A and 550B for receiving a tapered cylindrical bushing (see bushing 760 depicted in FIG. 15). Bushing 760 has a tapered outer diameter dimensioned to fit in grooves 550A and 550B and an inner diameter dimensioned to receive a cable to be joined.

Figure 10:
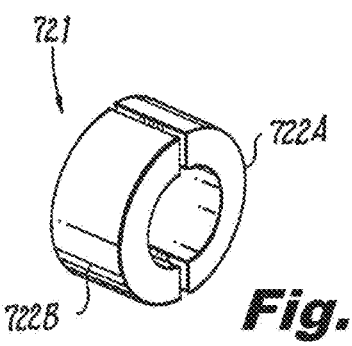

After the cables and bushings are positioned in mold half 502B, the other mold half 502A is clamped in position so that face portions 504A and 504B of the mold halves abut. The mold halves 502A and 502B may then be clamped together using a suitable clamp. Examples of clamps include the thermOweld® B-106, B-107 handle clamps manufactured by Continental Industries. A steel disc and welding material, e.g., an exothermic powder, are inserted into the reaction chamber (not shown) of mold 500. If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly 105, shown in FIG. 10, is inserted into the crucible and the ignitions system is activated to ignite the exothermic powder within the crucible causing the exothermic reaction to occur. Once the exothermic reaction initiates, the steel disc begins to melt and the molten steel flows down through an orifice portion into weld chamber 508 and welds the cables together. It will be appreciated that mold halves 502 may be joined by a hinge.

Figure 6:
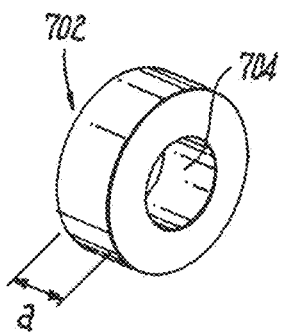
FIG. 6 depicts a bushing according to an illustrative embodiment of the present disclosure.
Figure 7A:
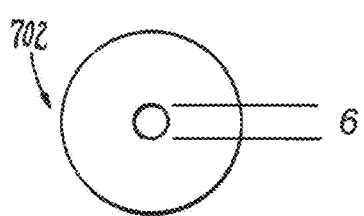
FIGS. 7A-7H depict bushings having various sized orifices according to illustrative embodiments of the present disclosure.
Figure 7B:
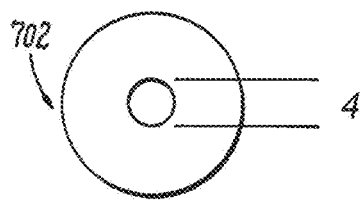
Figure 7C:
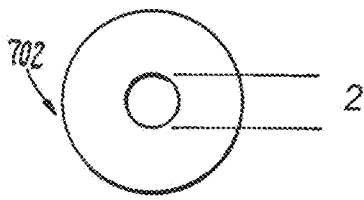
Figure 7D:
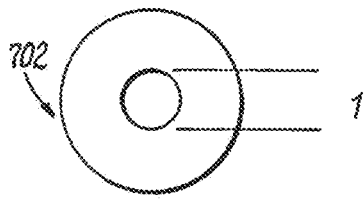
Figure 7E:
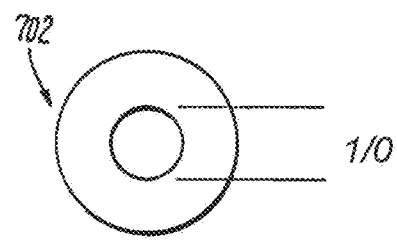
Figure 7F:
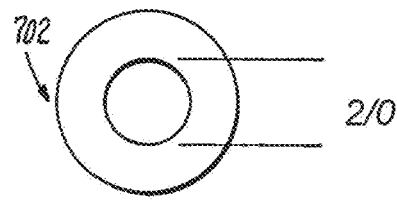
Figure 7G:
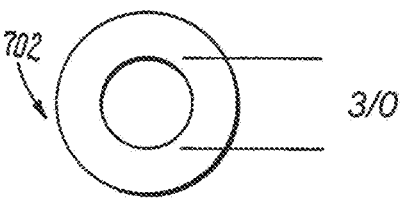
Figure 7H:
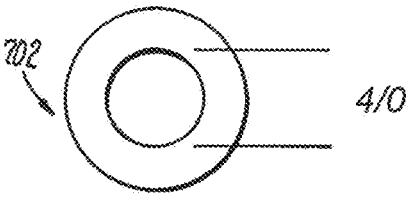

As described above, the bushings utilized for securing cables in the molds depicted herein may be provided in various shapes and configurations and for securing cables of various diameters to each other and/or to one or more ground rods. For example, according to an illustrative embodiment of the present disclosure, a bushing 702 is depicted in FIG. 6. Bushing 702 has a width "a" and an outer diameter dimensioned to fit within slot 122 (e.g., see FIGS. 1A-1C). An orifice 704 extends through bushing 702 for receiving a cable, ground rod, etc. to be welded. Orifice 704 may be dimensioned for receiving various sizes of cables including but not limited to #6 (FIG. 7A), #4 (FIG. 7B), #2 (FIG. 7C), #1 (FIG. 7D), #1/O (FIG. 7E), #2/0 (FIG. 7F), #3/0 (FIG. 7G) and #4/0 (FIG. 7H).

Figure 8:
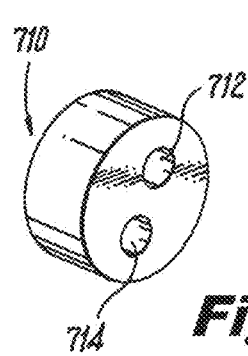
FIGS. 8-15 depict various configurations of bushings according to illustrative embodiments of the present disclosure.
Figure 9:
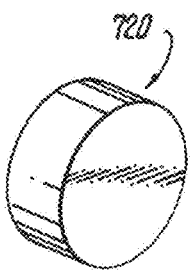
Figure 12:
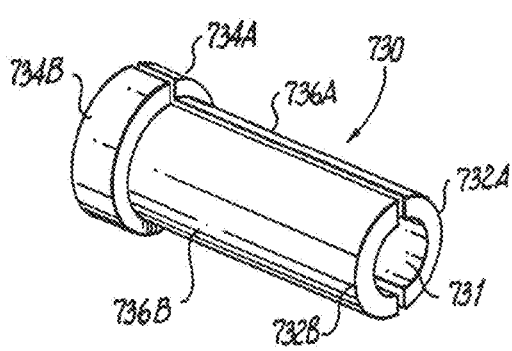
Figure 13:
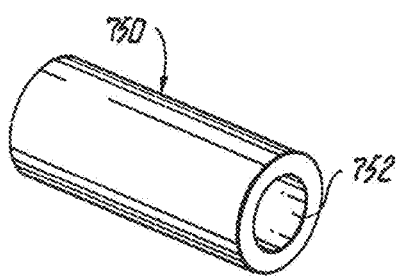
Figure 14:
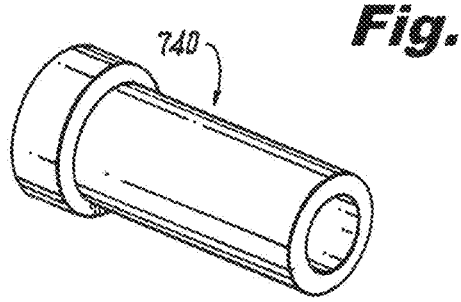
Figure 15:
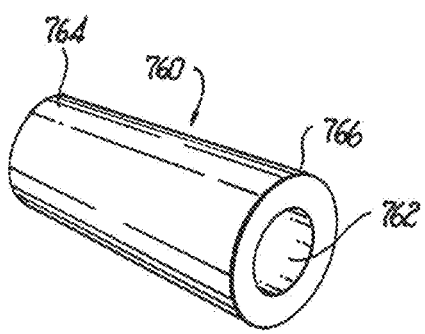

According to an illustrative embodiment of the present disclosure depicted in FIG. 8, a bushing 710 is dimensioned to fit within a slot in the bushing holding portion of the mold, e.g., slot 122, and may have 2 (or more) orifices (712 and 714) dimensioned to receive multiple cables to be welded. Orifices 712 and 714 may be dimensioned for receiving the same or different size cables as appropriate. FIG. 9 depicts a blank bushing 720 according to an illustrative embodiment of the present disclosure having no orifice and dimensioned to fit within one or more slots in the bushing holding portions in molds such as those depicted in FIGS. 2-5. Blank bushing 720 can be utilized as a plug to block one or more of the bushing holding portions so that the mold can be utilized to weld fewer cables. Another illustrative embodiment of the present disclosure is shown in FIG. 10 and is referred to herein as split bushing 721. Split bushing 721 includes halves 722A and 722B. Split bushing 721 can be utilized when it is inconvenient or not possible to slip a solid bushing over the terminal end of a cable. In addition, according to this embodiment, after the weld is performed, the split bushing 721 can be readily removed from the weld site. According to an illustrative embodiment depicted in FIG. 11, a bushing 724 is sized and dimensioned similar to bushing 150 (e.g., see FIGS. 1A-1C) but is split into two halves 726A and 726B. Split bushing 724 can be utilized when it is inconvenient or not possible to slip a solid bushing over the terminal end of a cable. In addition, according to this embodiment, once the weld is performed, the two halves 726A and 726B can be separated and readily removed from the weld site. A split bushing 730 according to another illustrative embodiment of the present disclosure is shown in FIG. 12 and includes two halves 732A and 732B. Each half includes a first tubular portion 736A and 736B dimensioned to sit in notch portion 120 (e.g., see FIGS. 1A, 1B) and a second tubular portion 734A and 734B dimensioned to sit in slot 122. The orifice 731 extending through split bushing 730 has a diameter dimensioned to receive a cable having a similar diameter. Split bushing 730 can be utilized when it is inconvenient or not possible to slip a solid bushing over the terminal end of a cable. In addition, according to this illustrative embodiment, once the weld is performed, the two halves 732A and 732B can be separated and readily removed from the weld site. FIG. 13 depicts a bushing or sleeve 750 similar to sleeve 157 described above with respect to FIGS. 3A, and 3B and has an outside diameter dimensioned to be received in notch portion 120 (FIGS. 1A and 1B) or slot 313 (FIGS. 3A and 3B). The orifice 752 extending through sleeve 750 has a diameter dimensioned to receive a cable to be welded. Of course, sleeve 750 may be a formed as a split sleeve having first and second abutting halves so that the sleeve can be readily removed from the weld site. FIG. 14 depicts a bushing 740 similar to split bushing 730 but is formed as one piece. According to this embodiment, bushing 740 will remain in position after the weld is performed. A tapered tubular bushing 760 according to another illustrative embodiment of the present disclosure is shown in FIG. 15. Bushing 760 is tapered from one end 766 to the other end 764 to fit within tapered grooves 550A and 550B as shown in FIG. 5. Bushing 760 includes an orifice 762 extending there through having a diameter dimensioned to receive a cable to be welded. Bushing 760 may be provided in two halves so that the bushing can be readily removed from the weld site.

Figure 16:
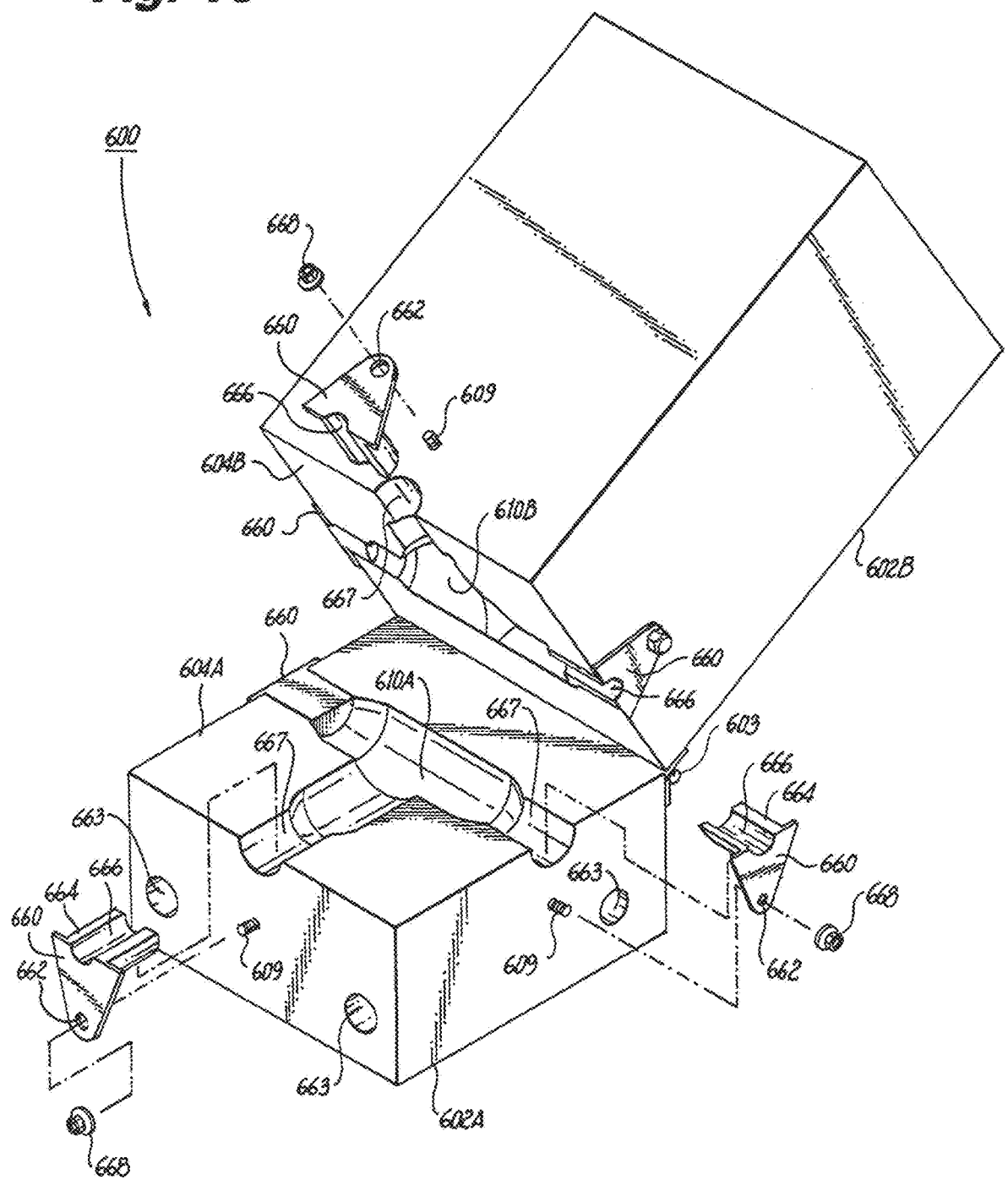
FIG. 16 depicts an exothermic reaction mold according to an illustrative embodiment of the present disclosure.
Figure 17A:
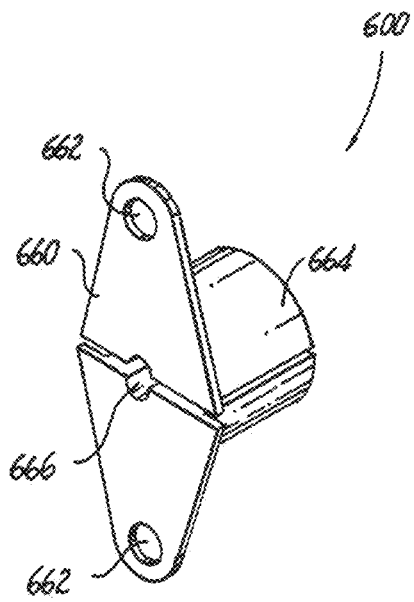
FIGS. 17A-17D depict bushings having various sized orifices according to illustrative embodiments of the present disclosure.
Figure 17B:
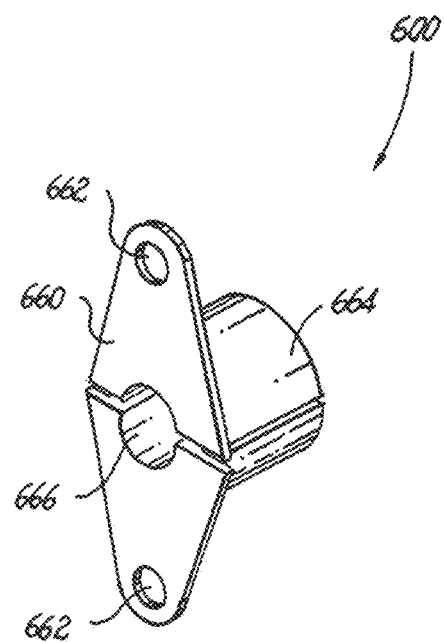
Figure 17C:
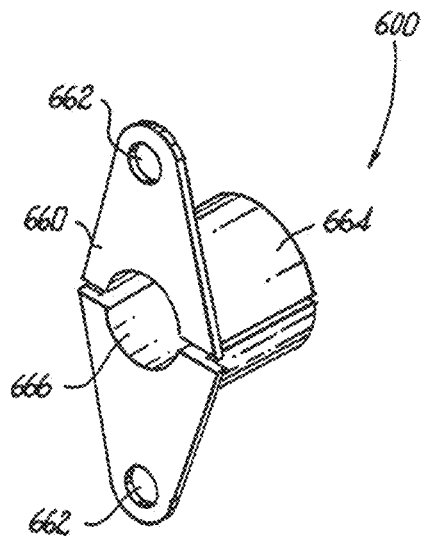
Figure 17D:
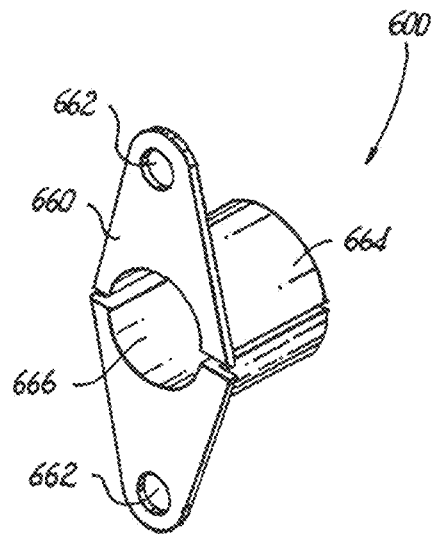

An exothermic reaction mold according to another illustrative embodiment of the present disclosure is shown in FIG. 16 and is referred to generally as mold 600. Mold 600 includes an upper horizontal mold half 602B and a lower horizontal mold half 602A. Mold halves 602A and 602B include abutting face portions 604A and 604B, respectively. According to an illustrative embodiment of the present disclosure, mold halves 602A, 602B may be joined together via a hinge assembly 603. Mold halves 602A and 602B include weld chamber portions 610A and 610B, respectively, forming a weld chamber. Although not shown, upper horizontal mold half 602B includes a reaction chamber that communicates via an orifice (not shown) with weld chamber portion 610B. Bushing holding slots 667 communicate with weld chamber portions 610A and 610B. According to an illustrative embodiment of the present disclosure, mold 600 is capable of welding up to three sections of cable. Alternatively, mold 600 may be used to weld a terminal end of a cable at a right angle to a single section of cable extending through mold 600. When properly positioned, the cables being welded together abut in weld chamber portions 610A and 610B. The size of the cable(s) capable of being welded together utilizing mold 600 may be selected by the end user by replacing removable bushings 660. For example, as shown in FIGS. 17A-17D, bushings 660 may be provided with different size slots 666 providing the end user with the ability to replace the bushings with the properly sized slot corresponding to the diameter of the cables being welded. In addition, a blank bushing 720 such as that shown in FIG. 9 may be provided having no slot 666. Blank bushing 720 allows mold 600 to be used to weld only two cables if desired. A portion 664 of bushings 660 (and blank bushing 720) has an outer diameter dimensioned to be received in slot 667 of mold 600. Bushings are removably attached to mold 600 utilizing threaded studs 609 which extend from mold 600. Each bushing 660 and 720 includes an orifice 662 for receiving threaded stud 609. Nuts 668 secure the bushing to mold 600. After the appropriately sized bushings 660 or blank bushing 720 are mounted to mold 600, the cables to be welded together are placed in the slots 666 of bushings 660 so that they abut one another in cable abutting section 610A. Mold section 602B is then brought down so that face portions 604A and 604B abut each other. Mold section 602A may include orifices 663 extending therein for receiving a portion of a clamp, not shown, used to secure the mold sections 602A, 602B together. Examples of clamps include the thermOweld® B-106, B-107 handle clamps manufactured by Continental Industries. A steel disc and welding material, e.g., an exothermic powder, are inserted in reaction chamber (not shown). If a flint gun is to be used to initiate the exothermic reaction, starting powder would be poured on the cover so that it covers the hole. The starting powder is then ignited which in turn ignites the exothermic powder within the crucible causing the exothermic reaction to occur. If an electrical ignition system is to be used to initiate the exothermic reaction, an ignitor is inserted into the exothermic powder in the crucible or a crucible assembly is inserted into the crucible and the ignitions system is activated to ignite the exothermic powder within the crucible causing the exothermic reaction to occur. Once the exothermic reaction initiates, the steel disc begins to melt and the molten steel flows down through the orifice (not shown) connecting the reaction chamber with weld chamber portions 610A and 610B forming the weld chamber and welds the cables together. Of course, the shapes and configurations of the bushings described herein.

The molds and bushings as described in the illustrative embodiments may be in kit form providing the end user with one or more molds and an accompanying array of bushings including blank bushings. This allows the end user to arrange the mold in various configurations as desired. For example, the user can configure the mold to receive cables having various diameters and using the blank bushings can modify the weld configuration provided by the mold.

The molds and/or bushings described in the illustrative embodiments may be formed from any material or materials suitable for the particular purpose. For example, the materials forming the molds and/or bushings may be formed from one or more materials capable of withstanding high temperatures without deforming. Non-limiting examples of a suitable material include graphite, porcelain and tungsten carbide.

Although the bushings and the slots in the molds for receiving the bushings are described in the present disclosure as generally cylindrical, it will be appreciated the outer surface of the bushings and the shape of the slots provided in the molds may take forms other than that shown. For example, the bushings may have square, rectangular, octagonal, oval, etc. shapes for fitting in similarly shaped slots provided in the molds.

Figure 18A:
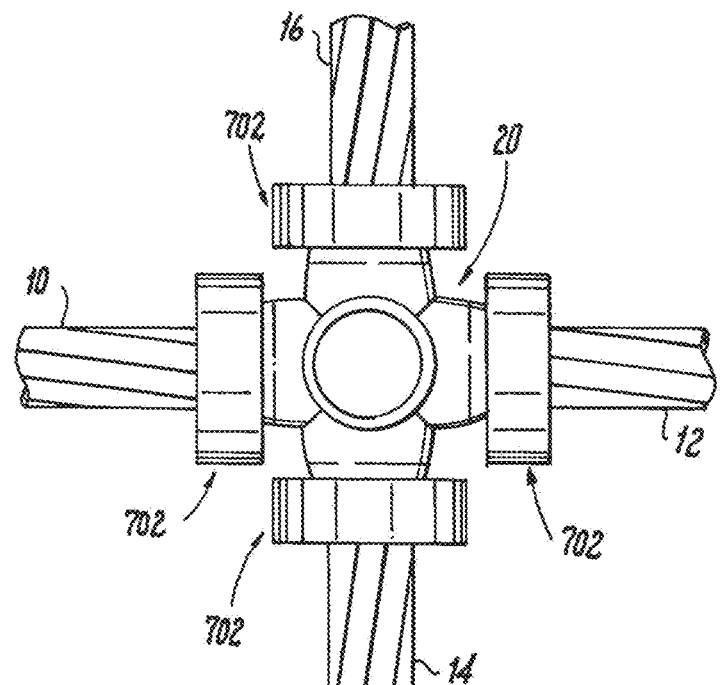
FIGS. 18A and 18B depict an illustrative embodiment of cables with bushings according to the present disclosure after welding.
Figure 18B:
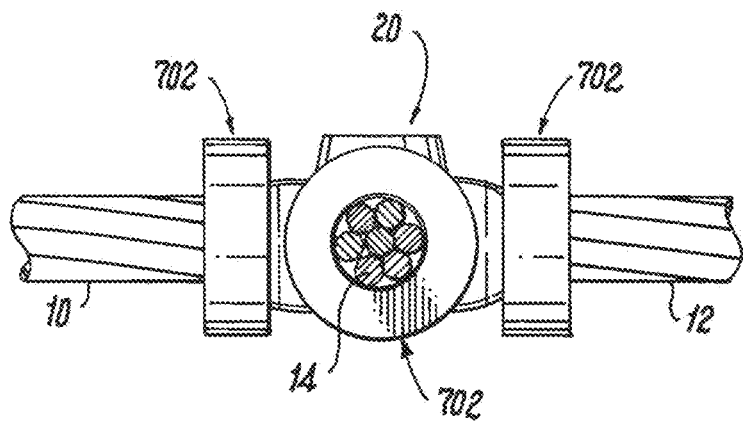
Figure 19A:
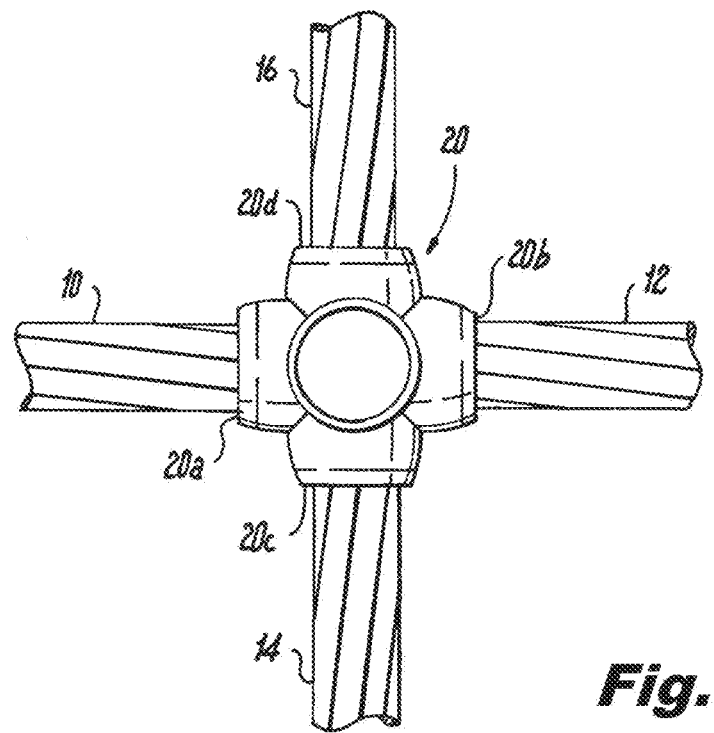
FIGS. 19A and 19B depict the welded cables of FIGS. 18A and 18B with the bushings removed.
Figure 19B:
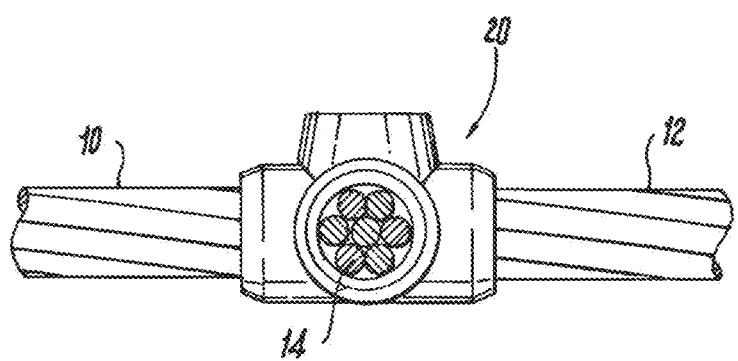

The molds and bushings described in the present illustrative embodiments provide high quality mold performance and improve the quality of the exothermic reaction weld process by controlling the weld metal flow within the mold. The molds and bushings described herein improve the quality of the exothermic reaction weld leaving a more finished weld than previously possible. More specifically, FIGS. 18A and 18B depict cables 10, 12, 14 and 16 with bushings 702, seen in FIG. 6, after being withdrawn from mold 400, seen in FIG. 4, after being welded at weld 20 as described herein. FIGS. 19A and 19B depict the cables 10, 12, 14 and 16 after welding with the bushings 702 removed. During the welding process, as the molten metal, e.g., steel, flows into the mold chamber portions of the mold 400, the bushings 702 block the flow of the molten metal causing the molten metal to fill any gaps between the mold and cable and creates a substantially straight junction between the cable and the resulting weld, as seen in FIGS. 19A and 19B. To illustrate, the junction 20*a* between the weld 20 and the cable 10 is a substantially straight junction. The junction 20*b* between the weld 20 and the cable 12 is a substantially straight junction. The junction 20*c* between the weld 20 and the cable 14 is a substantially straight junction, and the junction 20*d* between the weld 20 and the cable 16 is a substantially straight junction.

The configurable molds described with respect to the above illustrative embodiments have been described as welding cables together. Of course, it will be appreciated that the configurable molds described herein may be utilized to weld cables to pipes, plating, steel beams, rails (e.g., railroad rails), rebar, ground rods, etc. by providing appropriate mechanisms for maintaining the mold in contact with the pipes, plating, etc. For example, the mold may include a magnetic member for holding the mold in an appropriate position on the pipe or plating. In addition, or alternatively, a clamping mechanism may be provided for clamping the mold to the pipe or plating.

The present embodiments have been described as joining cables. The term cable as used herein broadly refers to any type of strand of material capable of being welded included single strand, multi-strand, solid rod (e.g., ground rod), etc.

Although not shown in the above-described embodiments, the exothermic molds may include removable covers covering the exothermic reaction chamber. The covers may be connected to the molds by a hinge assembly.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An exothermic reaction mold kit comprising:
   a plurality of bushings, each of the plurality of bushings includes:
     a first bushing portion having an outer diameter that is uniform along a width of the first bushing portion;
     a second bushing portion adjacent the first bushing portion and having an outer diameter that is uniform along a width of the second bushing portion, wherein the uniform outer diameter of the first bushing portion is larger than the uniform outer diameter of the second bushing portion;
     a third bushing portion adjacent the second bushing portion and having an outer diameter that is uniform along a width of the third bushing portion, wherein the uniform outer diameter of the third bushing portion is larger than the uniform outer diameter of the second bushing portion; and
     an orifice extending through the first bushing portion, the second bushing portion and the third bushing portion, the orifice having an inner diameter dimensioned to receive a cable; and
   an exothermic reaction mold including:
     a reaction chamber;
     a weld chamber in communication with the reaction chamber; and
     a plurality of user configurable ports, each user configurable port being in communication with the weld chamber, each user configurable port having a bushing holding portion, each bushing holding portion having a first portion and a second portion, wherein the first portion has a shape that corresponds to a shape of the first bushing portion so that the first portion can removably receive the first bushing portion, and wherein the second portion has a shape that corresponds to a shape of the second bushing portion so that the second portion can removably receive the second bushing portion.

2. The exothermic reaction mold kit as recited in claim 1, wherein each of the plurality of bushings is a one-piece bushing.

3. The exothermic reaction mold kit as recited in claim 1, wherein at least one of the plurality of bushings is split into two sections.

4. The exothermic reaction mold kit as recited in claim 1, wherein at least one of the plurality of bushings blocks at least one of the user configurable ports.

5. The exothermic reaction mold kit as recited in claim 1, wherein the plurality of user configurable ports comprise up to four user configurable ports.

6. The exothermic reaction mold kit as recited in claim 5, wherein at least one of the up to four user configurable ports is selectively blockable_so that the mold can be used to weld fewer cables.

7. The exothermic reaction mold kit as recited in claim 1, wherein the mold is vertically divided into at least two parts.

8. The exothermic reaction mold kit as recited in claim 1, wherein the mold is horizontally divided into at least two parts.

9. An exothermic reaction mold kit comprising:
   a plurality of bushings, each of the plurality of bushings includes:
      a first bushing portion having an outer diameter that is uniform along a width of the first bushing portion;
      a second bushing portion adjacent the first bushing portion and having an outer diameter that is uniform along a width of the second bushing portion, wherein the uniform outer diameter of the first bushing portion is larger than the uniform outer diameter of the second bushing portion;
      a third bushing portion adjacent the second bushing portion and having an outer diameter that is uniform along a width of the third bushing portion, wherein the uniform outer diameter of the third bushing portion is larger than the uniform outer diameter of the second bushing portion; and
      an orifice extending through the first bushing portion, the second bushing portion and the third bushing portion, the orifice having an inner diameter dimensioned to receive a cable; and
   an exothermic reaction mold including:
      a first mold section having an exothermic reaction chamber and a first weld chamber portion in communication with the exothermic reaction chamber, the first weld chamber portion including a plurality of first port portions, each of the first port portions includes a first bushing receiving portion and a second bushing receiving portion, wherein the first bushing receiving portion has a shape that corresponds to a shape of a first portion of the first bushing portion so that the first bushing receiving portion can removably receive the first portion of the first bushing portion, and wherein the second bushing receiving portion has a shape that corresponds to a shape of a first portion of the second bushing portion so that the second bushing receiving portion can removably receive the first portion of the second bushing portion;
      a second mold section having a second weld chamber portion in communication with the exothermic reaction chamber, the second weld chamber portion including a plurality of second port portions, each of the second port portions includes a third bushing receiving portion and a fourth bushing receiving portion, wherein the third bushing receiving portion has a shape that corresponds to a shape of a second portion of the first bushing portion so that the third bushing receiving portion can receive the second portion of the first bushing portion, and wherein the fourth bushing receiving portion has a shape that corresponds to a shape of a second portion of the second bushing portion so that the fourth bushing receiving portion can receive the second portion of the second bushing portion;
   wherein when the first mold section is mated with the second mold section, the first weld chamber portion and the second weld chamber portion form a weld chamber, the first port portions and the second port portions form a plurality of user configurable ports, and the first bushing receiving portion, the second bushing receiving portion, the third bushing receiving portion and fourth bushing receiving portion form a bushing holding portion.

10. The exothermic reaction mold kit as recited in claim 9, wherein the first mold section and the second mold section are connected by a hinge assembly.

11. The exothermic reaction mold kit as recited in claim 9, wherein each of the first bushing receiving portions comprise slots.

12. The exothermic reaction mold kit as recited in claim 9, wherein each of the plurality of the bushings is a split bushing.

13. The exothermic reaction mold kit as recited in claim 9, wherein the first bushing portion of at least one of the plurality of bushings is solid and blocks one of the plurality of user configurable ports.

14. An exothermic reaction mold kit comprising:
   a plurality of bushings, each of the plurality of bushings having:
      a first bushing portion having an outer diameter that is uniform along a width of the first bushing portion;
      a second bushing portion adjacent the first bushing portion and having an outer diameter that is uniform along a width of the second bushing portion, wherein the uniform outer diameter of the first bushing portion is larger than the uniform outer diameter of the second bushing portion;
      a third bushing portion adjacent the second bushing portion and having an outer diameter that is uniform along a width of the third bushing portion, wherein the uniform outer diameter of the third bushing portion is larger than the uniform outer diameter of the second bushing portion; and
      an orifice extending through the first bushing portion, the second bushing portion and the third bushing portion, the orifice having an inner diameter dimensioned to receive a cable; and
   an exothermic reaction mold including:
      a reaction chamber;
      a weld chamber in communication with the reaction chamber; and
      a plurality of user configurable ports in communication with the weld chamber, each of the plurality of user configurable ports including a bushing holding portion having a first portion and a second portion, wherein the first portion has a shape that corresponds to a shape of the first bushing portion so that the first portion can removably receive the first bushing portion, and wherein the second portion has a shape that corresponds to a shape of the second bushing portion so that the second portion is shaped to removably receive the second bushing portion.

15. The exothermic reaction mold kit as recited in claim 14, wherein the inner diameter of the orifice in each of the plurality of bushings is the same.

16. The exothermic reaction mold kit as recited in claim 14, wherein the plurality of bushings comprises multiple sets of bushings, each set including one or more bushings having the same inner diameter orifice.

17. The exothermic reaction mold kit as recited in claim 14, wherein the plurality of bushings comprises multiple sets of bushings, each set including one or more bushings having a different inner diameter orifice.

18. The exothermic reaction mold kit as recited in claim 14, wherein at least one of the plurality of bushings comprises a blank bushing having no orifice extending there through.

* * * * *